United States Patent
Brydon et al.

(10) Patent No.: US 7,877,266 B2
(45) Date of Patent: Jan. 25, 2011

(54) SYSTEM AND METHOD FOR USING SOCIAL NETWORKS TO FACILITATE BUSINESS PROCESSES

(75) Inventors: Antony Brydon, New York, NY (US); Jeff Patterson, New York, NY (US)

(73) Assignee: Dun & Bradstreet, Inc., Short Hills, NJ (US)

( * ) Notice: Subject to any disclaimer, the term of this patent is extended or adjusted under 35 U.S.C. 154(b) by 0 days.

(21) Appl. No.: 11/193,307

(22) Filed: Jul. 28, 2005

(65) Prior Publication Data

US 2006/0026033 A1 Feb. 2, 2006

Related U.S. Application Data

(60) Provisional application No. 60/592,294, filed on Jul. 28, 2004, provisional application No. 60/592,295, filed on Jul. 28, 2004.

(51) Int. Cl.
*G06Q 99/00* (2006.01)
(52) U.S. Cl. ....................................... 705/1.1
(58) Field of Classification Search .............. 705/1, 705/1.1
See application file for complete search history.

(56) References Cited

U.S. PATENT DOCUMENTS

| | | | |
|---|---|---|---|
| 5,034,898 A | 7/1991 | Lu et al. |
| 5,129,082 A | 7/1992 | Tirfing et al. |
| 5,465,319 A | 11/1995 | Ahamed |
| 5,628,011 A | 5/1997 | Ahamed et al. |
| 5,715,371 A | 2/1998 | Ahamed et al. |
| 5,715,443 A | 2/1998 | Yanagihara et al. |
| 5,727,201 A | 3/1998 | Burke |
| 5,761,662 A | 6/1998 | Dasan |
| 5,802,515 A | 9/1998 | Adar et al. |
| 5,826,269 A | 10/1998 | Hussey |
| 5,890,162 A | 3/1999 | Huckins |
| 5,895,471 A | 4/1999 | King et al. |
| 5,903,890 A | 5/1999 | Shoji et al. |
| 5,905,862 A | 5/1999 | Hoekstra |
| 5,931,908 A | 8/1999 | Gerba et al. |
| 5,950,200 A | 9/1999 | Sudai et al. |
| 5,963,951 A | 10/1999 | Collins |
| 5,983,022 A | 11/1999 | Watkins et al. |

(Continued)

OTHER PUBLICATIONS

"PlanetAll plans to make a world of difference in busy lives; New interactive service keeps people connected, coordinated and clued-in," *Business Wire*, 1996, p. 11130173.

(Continued)

*Primary Examiner*—Jonathan Ouellette
(74) *Attorney, Agent, or Firm*—Ohlandt, Greeley, Ruggiero & Perle, LLP

(57) ABSTRACT

The present invention provides methods and systems for facilitating business processes in an enterprise application. The method according to one embodiment of the present invention comprises obtaining information regarding one or more entities and analyzing the information regarding the one or more entities to determine one or more paths between the one or more entities and one or more members of an enterprise. Information regarding the one or more entities is distributed to the one or more members of the enterprise where one or more paths exist between the one or more members of the enterprise and the one or more entities.

19 Claims, 23 Drawing Sheets

U.S. PATENT DOCUMENTS

| | | | |
|---|---|---|---|
| 6,038,566 | A | 3/2000 | Tsai |
| 6,052,122 | A | 4/2000 | Sutcliffe et al. |
| 6,061,680 | A | 5/2000 | Scherf et al. |
| 6,073,105 | A | 6/2000 | Sutcliffe et al. |
| 6,073,138 | A | 6/2000 | de l'Etraz et al. |
| 6,088,699 | A | 7/2000 | Gampper et al. |
| 6,115,709 | A | 9/2000 | Gilmour et al. |
| 6,122,637 | A | 9/2000 | Yohe et al. |
| 6,151,643 | A | 11/2000 | Cheng et al. |
| 6,154,783 | A | 11/2000 | Gilmour et al. |
| 6,167,435 | A | 12/2000 | Druckenmiller et al. |
| 6,175,831 | B1 | 1/2001 | Weinreich et al. |
| 6,182,067 | B1 | 1/2001 | Presnell et al. |
| 6,182,118 | B1 | 1/2001 | Finney et al. |
| 6,189,101 | B1 | 2/2001 | Dusenbury, Jr. |
| 6,192,362 | B1 | 2/2001 | Schneck et al. |
| 6,195,654 | B1 | 2/2001 | Wachtel |
| 6,205,472 | B1 | 3/2001 | Gilmour |
| 6,216,122 | B1 | 4/2001 | Elson |
| 6,226,649 | B1 | 5/2001 | Bodamer et al. |
| 6,230,156 | B1 | 5/2001 | Hussey |
| 6,249,282 | B1 | 6/2001 | Sutcliffe et al. |
| 6,249,805 | B1 | 6/2001 | Fleming, III |
| 6,253,023 | B1 | 6/2001 | Fukushima et al. |
| 6,253,202 | B1 | 6/2001 | Gilmour |
| 6,260,039 | B1 | 7/2001 | Schneck et al. |
| 6,263,340 | B1 | 7/2001 | Green |
| 6,266,659 | B1 | 7/2001 | Nadkarni |
| 6,266,661 | B1 | 7/2001 | Lewish et al. |
| 6,269,369 | B1 | 7/2001 | Robertson |
| 6,279,001 | B1 | 8/2001 | DeBettencourt et al. |
| 6,292,904 | B1 | 9/2001 | Broomhall et al. |
| 6,308,176 | B1 | 10/2001 | Bagshaw |
| 6,317,748 | B1 | 11/2001 | Menzies et al. |
| 6,324,535 | B1 | 11/2001 | Bair et al. |
| 6,324,541 | B1 | 11/2001 | de l'Etraz et al. |
| 6,345,268 | B1 | 2/2002 | de la Huerga |
| 6,349,307 | B1 | 2/2002 | Chen |
| 6,351,747 | B1 | 2/2002 | Urazov et al. |
| 6,356,893 | B1 | 3/2002 | Itakura et al. |
| 6,363,415 | B1 | 3/2002 | Finney et al. |
| 6,366,907 | B1 | 4/2002 | Fanning et al. |
| 6,370,541 | B1 | 4/2002 | Chou et al. |
| 6,370,542 | B1 | 4/2002 | Kenyon |
| 6,370,575 | B1 | 4/2002 | Dougherty et al. |
| 6,374,237 | B1 | 4/2002 | Reese |
| 6,377,948 | B2 | 4/2002 | Kikuchi et al. |
| 6,377,949 | B1 | 4/2002 | Gilmour |
| 6,377,961 | B1 | 4/2002 | Ryu |
| 6,381,593 | B1 | 4/2002 | Yano et al. |
| 6,381,640 | B1 | 4/2002 | Beck et al. |
| 6,385,604 | B1 | 5/2002 | Bakalash et al. |
| 6,385,644 | B1 | 5/2002 | Devine et al. |
| 6,389,422 | B1 | 5/2002 | Doi et al. |
| 6,392,669 | B1 | 5/2002 | Matoba et al. |
| 6,393,417 | B1 | 5/2002 | De Le fevre |
| 6,401,101 | B1 | 6/2002 | Britton et al. |
| 6,401,122 | B1 | 6/2002 | Matsui et al. |
| 6,405,197 | B2 | 6/2002 | Gilmour |
| 6,418,445 | B1 | 7/2002 | Moerbeek |
| 6,421,669 | B1 | 7/2002 | Gilmour et al. |
| 6,421,725 | B1 | 7/2002 | Vermilyea et al. |
| 6,424,870 | B1 | 7/2002 | Maeda et al. |
| 6,424,968 | B1 | 7/2002 | Broster et al. |
| 6,425,002 | B1 | 7/2002 | Zurcher et al. |
| 6,430,574 | B1 | 8/2002 | Stead |
| 6,434,603 | B1 | 8/2002 | Tsuji et al. |
| 6,434,605 | B1 | 8/2002 | Faulkner et al. |
| 6,438,579 | B1 | 8/2002 | Hosken |
| 6,442,438 | B1 | 8/2002 | Naillon |
| 6,457,076 | B1 | 9/2002 | Cheng et al. |
| 6,460,050 | B1 | 10/2002 | Pace et al. |
| 6,460,073 | B1 | 10/2002 | Asakura |
| 6,463,455 | B1 | 10/2002 | Turner et al. |
| 6,470,269 | B1 | 10/2002 | Adar et al. |
| 6,477,575 | B1 | 11/2002 | Koeppel et al. |
| 6,480,881 | B1 | 11/2002 | Kubota et al. |
| 6,487,548 | B1 | 11/2002 | Leymann et al. |
| 6,487,585 | B1 | 11/2002 | Yurkovic |
| 6,493,702 | B1 | 12/2002 | Adar et al. |
| 6,493,719 | B1 | 12/2002 | Booth et al. |
| 6,493,742 | B1 | 12/2002 | Holland et al. |
| 6,502,134 | B1 | 12/2002 | Makarios et al. |
| 6,505,211 | B1 | 1/2003 | Dessloch et al. |
| 6,510,454 | B1 | 1/2003 | Walukiewicz |
| 6,519,606 | B2 | 2/2003 | Burton et al. |
| 6,529,908 | B1 | 3/2003 | Piett et al. |
| 6,529,914 | B1 | 3/2003 | Doan et al. |
| 6,532,473 | B2 | 3/2003 | Niazi et al. |
| 6,535,887 | B1 | 3/2003 | Komine et al. |
| 6,535,916 | B1 | 3/2003 | Nguyen |
| 6,539,232 | B2 | 3/2003 | Hendrey et al. |
| 6,539,396 | B1 | 3/2003 | Bowman-Amuah |
| 6,539,420 | B1 | 3/2003 | Fields et al. |
| 6,542,749 | B2 | 4/2003 | Tanaka et al. |
| 6,542,900 | B1 | 4/2003 | Xia |
| 6,546,398 | B1 | 4/2003 | Simon |
| 6,549,933 | B1 | 4/2003 | Barrett et al. |
| 6,549,939 | B1 | 4/2003 | Ford et al. |
| 6,549,941 | B1 | 4/2003 | Jaquith et al. |
| 6,553,368 | B2 | 4/2003 | Martin et al. |
| 6,557,004 | B1 | 4/2003 | Ben-Shachar et al. |
| 6,557,036 | B1 | 4/2003 | Kavacheri et al. |
| 6,578,028 | B2 | 6/2003 | Egilsson et al. |
| 6,581,092 | B1 | 6/2003 | Motoyama et al. |
| 6,587,124 | B1 | 7/2003 | Slaby |
| 6,591,293 | B1 | 7/2003 | Poetzschke et al. |
| 6,591,295 | B1 | 7/2003 | Diamond et al. |
| 6,593,949 | B1 | 7/2003 | Chew et al. |
| 6,629,100 | B2 | 9/2003 | Morris et al. |
| 6,629,132 | B1 | 9/2003 | Ganguly et al. |
| 6,631,410 | B1 | 10/2003 | Kowalski et al. |
| 6,633,911 | B1 | 10/2003 | Matsuzaki et al. |
| 6,640,229 | B1 | 10/2003 | Gilmour et al. |
| 6,643,669 | B1 | 11/2003 | Novak et al. |
| 6,647,384 | B2 | 11/2003 | Gilmour |
| 6,662,191 | B1 | 12/2003 | Cherniavsky et al. |
| 6,665,658 | B1 | 12/2003 | DaCosta et al. |
| 6,668,251 | B1 | 12/2003 | Goldberg |
| 6,697,807 | B2 | 2/2004 | McGeachie |
| 6,735,585 | B1 * | 5/2004 | Black et al. ............ 707/3 |
| 2001/0013029 | A1 | 8/2001 | Gilmour |
| 2001/0025280 | A1 | 9/2001 | Mandato et al. |
| 2001/0032208 | A1 | 10/2001 | Duxbury |
| 2001/0032209 | A1 | 10/2001 | Duxbury |
| 2001/0042103 | A1 | 11/2001 | Tomari et al. |
| 2001/0047408 | A1 | 11/2001 | Jacobs et al. |
| 2001/0049686 | A1 | 12/2001 | Nelson et al. |
| 2001/0049687 | A1 | 12/2001 | Russell |
| 2001/0052080 | A1 | 12/2001 | Dusenbury, Jr. |
| 2001/0054032 | A1 | 12/2001 | Goldman et al. |
| 2001/0056484 | A1 | 12/2001 | Blumenstock |
| 2002/0010747 | A1 | 1/2002 | Jaehyuk-Hwang |
| 2002/0023230 | A1 | 2/2002 | Bolnick et al. |
| 2002/0035634 | A1 | 3/2002 | Smolarski-Koff et al. |
| 2002/0035643 | A1 | 3/2002 | Morita |
| 2002/0052858 | A1 | 5/2002 | Goldman et al. |
| 2002/0059201 | A1 | 5/2002 | Work |
| 2002/0059387 | A1 | 5/2002 | Wolfe |
| 2002/0059418 | A1 | 5/2002 | Bird et al. |
| 2002/0062368 | A1 | 5/2002 | Holtzman et al. |
| 2002/0078050 | A1 | 6/2002 | Gilmour |
| 2002/0080387 | A1 | 6/2002 | Grasso et al. |
| 2002/0083151 | A1 | 6/2002 | Adams et al. |

| | | | |
|---|---|---|---|
| 2002/0091667 A1 | 7/2002 | Jaipuria | |
| 2002/0107957 A1 | 8/2002 | Zargham et al. | |
| 2002/0111852 A1 | 8/2002 | Levine | |
| 2002/0112013 A1 | 8/2002 | Walsh | |
| 2002/0116466 A1 | 8/2002 | Trevithick et al. | |
| 2002/0120699 A1 | 8/2002 | Wakabayashi | |
| 2002/0124053 A1 | 9/2002 | Adams et al. | |
| 2002/0129141 A1 | 9/2002 | Sogabe et al. | |
| 2002/0138496 A1 | 9/2002 | Schambach et al. | |
| 2002/0165861 A1 | 11/2002 | Gilmour | |
| 2002/0169737 A1 | 11/2002 | Armstrong et al. | |
| 2002/0194112 A1 | 12/2002 | dePinto et al. | |
| 2002/0194178 A1 | 12/2002 | Gilmour et al. | |
| 2002/0194256 A1 | 12/2002 | Needham et al. | |
| 2003/0014491 A1 | 1/2003 | Horvitz et al. | |
| 2003/0018726 A1 | 1/2003 | Low et al. | |
| 2003/0041042 A1 | 2/2003 | Cohen et al. | |
| 2003/0041071 A1 | 2/2003 | Wakai et al. | |
| 2003/0046097 A1* | 3/2003 | LaSalle et al. | 705/1 |
| 2003/0050924 A1 | 3/2003 | Faybishenko et al. | |
| 2003/0050977 A1 | 3/2003 | Puthenkulam et al. | |
| 2003/0050983 A1 | 3/2003 | Johnson | |
| 2003/0063072 A1 | 4/2003 | Brandenberg et al. | |
| 2003/0069892 A1 | 4/2003 | Hind et al. | |
| 2003/0074409 A1 | 4/2003 | Bentley | |
| 2003/0088458 A1 | 5/2003 | Afeyan et al. | |
| 2003/0088627 A1 | 5/2003 | Rothwell et al. | |
| 2003/0093420 A1 | 5/2003 | Ramme | |
| 2003/0093478 A1 | 5/2003 | Hughes | |
| 2003/0093483 A1 | 5/2003 | Allen et al. | |
| 2003/0101024 A1 | 5/2003 | Adar et al. | |
| 2003/0115370 A1 | 6/2003 | Jacquin et al. | |
| 2003/0149733 A1 | 8/2003 | Capiel | |
| 2003/0154213 A1 | 8/2003 | Ahn | |
| 2003/0158855 A1 | 8/2003 | Farnham et al. | |
| 2003/0167324 A1 | 9/2003 | Farnham et al. | |
| 2003/0167326 A1 | 9/2003 | de Bonet | |
| 2003/0172067 A1 | 9/2003 | Adar et al. | |
| 2003/0177190 A1 | 9/2003 | Moody et al. | |
| 2003/0182307 A1 | 9/2003 | Chen et al. | |
| 2003/0187813 A1* | 10/2003 | Goldman et al. | 707/1 |
| 2003/0191835 A1 | 10/2003 | Hauck et al. | |
| 2003/0200190 A1 | 10/2003 | Adar et al. | |
| 2003/0204581 A1 | 10/2003 | Adar et al. | |
| 2003/0204604 A1 | 10/2003 | Adar et al. | |
| 2003/0217106 A1 | 11/2003 | Adar et al. | |
| 2003/0220976 A1 | 11/2003 | Malik | |
| 2003/0225834 A1 | 12/2003 | Lee et al. | |
| 2003/0233408 A1 | 12/2003 | Goodman | |
| 2004/0128322 A1* | 7/2004 | Nagy | 707/104.1 |
| 2006/0004869 A1* | 1/2006 | Yuster et al. | 707/104.1 |

OTHER PUBLICATIONS

"PlanetAll Validates Six Degrees of Separation Theory," *PR Newswire*, 1997, p. 224.

"Sage Enterprises, Inc. (announces PlanetAll Web site," *Computerworld*, 1997, v31, n1, p. 56.

Bjorner, Susanne, "Day tripping to Internet World. (Fall 1996 trade show)," *Gale Group Magazine*, v5, n2, p. 50.

Cardwell, Annette, "CYBERSCENE; PlanetAll keeps you in touch", *Boston Herald*, First Ed., 1996, p. s28.

"USA Company: Six Degrees of Networking", *EIU ViewsWire*, 1997.

"Three degrees of trial separation", *Economist*, 1997, v343n8015, p. 59.

Stern, Gary M., "Sixdegrees . . . a networking service", *Link-Up*, v14n4, 1997, p. 25.

"Six Degrees of Separation", *ADWEEK Eastern Edition*, 1997, p. 9.

"Novel Services Use Matchmaking Model", *NetGuide Magazine*, 1997, v4, n7, pp. 59-60.

"Online—Connect", *Newsweek*, 1997, vol. 129, iss. 18, p. 11.

Snider, Mike, "Easing new users onto the Internet", *USA Today*, Final Ed., 1997, Section LIFE, p. 6D.

Weisul, Kimberly, "Bankers Trust execs pitch in with unusual Web site", *Investment Dealers Digest*, 1997, v63n5, p. 14.

Vivacqua, Adriana S., Software Agents Group, MIT Media Lab, "Agents for Expertise Location", *American Association for Artificial Intelligence*.

Yu, Bin, et al., Department of Computer Science, North Carolina State University, "A Multiagent Referral System for Expertise Location".

Burt, Ronald S., University of Chicago and Institute Européen d'Administration d'Affaires (INSEAD), "The Network Structure of Social Capital", pp. 1-83.

Boardwalk, Ltd., "boardwalk, Where Decision-Makers Meet", (8 pages).

Kautz, Henry, et al., "Creating Models of Real-World Communities with ReferralWeb", pp. 1-38.

Kautz, Henry, et al., "The Hidden Web", *The American Association for Artificial Intelligence*, 1997, pp. 27-36.

Kautz, Henry, et al., "ReferralWeb: Combining Social Networks and Collaborative Filtering", *Communications of the ACM*, 1997, vol. 40, No. 3, pp. 1-4.

Kautz, Henry, et al., "Agent Amplified Communication", *Thirteenth National Conference on Artificial Intelligence* (AAAI-96), Portland, OR, 1996, (7 pages).

Foner, Leonard N., MIT Media Lab, "A Multi-Agent Referral System for Matchmaking", (8 pages).

Kautz, Henry, et al., "Creating Models of Real-World Communities with Referral Web", (2 pages).

* cited by examiner

Visible Path RCM for Enterprise Home — VP Logo

Visible Path RCM for Sales | Sales Icon | Home | Prospecting | Lead and Account Analysis | Lead Distribution

Run List Analysis

Select a lead or account list to analyze below. You can also manage your lists.

[Upload Lead or Account List]

Displaying lists 1 thru 25 of 27 lists found. Previous Page | Next Page

| Delete | Owner | List Name | Date Created | Last Wizard | Companies / Contacts 2 | Shared |
|---|---|---|---|---|---|---|
| ☐ | UserName | Aberdeen Leads | 4/26/04 | 4/26/04 | 657 | Yes |
| ☐ | UserName | CRM Point Leads | 5/1/04 | | 1322 | Yes |
| ☐ | UserName | Selling Power Leads | 3/26/04 | 3/26/04 | 67 | Yes |
| ☐ | UserName | Teneo Leads | 3/21/04 | 3/21/04 | 457 | Yes |
| ☐ | UserName | Xavier Leads | 2/2/04 | | 788 | Yes |

Check All  Uncheck All  Delete

VP Platform

Visible Path RCM for Enterprise Home

| Visible Path RCM for Sales | Sales Icon | Home | Prospecting | Lead and Account Analysis | Lead Distribution |

Results (Prioritized by Contact)

Lead List Information:
List Name: Aberdeen Leads
Owner: UserName
Date Created: 5/1/04
Last Viewed: 5/5/04
Companies / Contacts: 766
Public: Yes Analysis Visualization:
Use the analysis visualization for guidance.
766 Contacts found — Aberdeen Leads 900 Contacts
— Vision Path Relationship Network 12,322 Contacts Displaying contact 1 thru 25 of 766 contacts found.
Previous Page    Next Page

| Name | Title | Email | Best Company Path | Last Seen | Company | Delivery Corrections ? |
|---|---|---|---|---|---|---|
| Bill Johnson | CEO | | | 4/26/04 | Altix Tech. | 20 |
| Jill Bennett | CTO | | | 5/1/04 | Zavier Cons. | 3 |
| John Sorter | CEO | | | 3/29/04 | Callite LLC. | 28 |
| John Spert | CFO | | | 3/21/04 | Abaxcer Corp. | 15 |
| Beth Tanner | Mktg. Dir. | | | 2/2/04 | Renolyds | 2 |

Prioritize by Company — 1402

Share    Run New Analysis    Export

VP Platform

SYSTEM AND METHOD FOR USING SOCIAL NETWORKS TO FACILITATE BUSINESS PROCESSES

Applicants hereby claim the benefit of U.S. Provisional Patent Application Ser. No. 60/592,294 entitled, "SALES FACILITATION SYSTEMS AND METHODS IN AN ENTERPRISE RELATIONSHIP MANAGEMENT SYSTEM," filed Jul. 28, 2004, which is hereby incorporated herein by reference in its entirety. Applicants hereby further claim the benefit of U.S. Provisional Patent Application Ser. No. 60/592,295 entitled, "MARKETING FACILITATION SYSTEMS AND METHODS IN AN ENTERPRISE RELATIONSHIP MANAGEMENT SYSTEM", filed Jul. 28, 2004, which is hereby incorporated herein by reference in its entirety.

CROSS-REFERENCE TO RELATED APPLICATIONS

This application is related to U.S. patent application Ser. No. 11/132,159 entitled, "SYSTEM AND METHOD FOR ENFORCING PRIVACY IN SOCIAL NETWORKS," filed May 17, 2005, which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for facilitating business processes, such as sales and sales related tasks, marketing and marketing related tasks, and hiring and hiring related tasks, in conjunction with enterprise software for the end goals of increased productivity, increased revenues, reduced cost of customer acquisition, increased response rates, decreased cost per hire, higher profitability, etc. Particularly, the present invention provides methods and systems that facilitate business processes by leveraging the social networks and relationship capital of both an enterprise and members of an enterprise, both alone and in combination with other enterprise software applications.

An enterprise typically uses one or more Enterprise Relationship Management ("ERM") software applications to allow employees to manage personal and professional relationships and information. Messaging software applications ("messaging") typically provide comprehensive automation packages for contact management, note and information sharing, calendaring, email, instant messaging, to-do lists, etc. One example of a messaging application is Outlook sold by MICROSOFT CORPORATION®as part of its Office suite of applications. Other communications systems and software ("Communications") found in the enterprise include instant messaging applications, as well as telephone and Voice over IP ("VoIP") applications.

In addition to ERM, Messaging and Communications applications, enterprises typically employ other software applications to manage relationships both inside and outside the enterprise. For example, Customer Relationship Management ("CRM") software helps a company manage existing and developing customer relationships in an efficient and organized manner, Sales Force Automation ("SFA") software increases a sales team's efficiency and effectiveness by automating, organizing and tracking the sales process, Partner Relationship Management ("PRM") software facilitates and automates the sales processes across distributors and external sales channels, and Employee Relationship Management ("eRM") improves the management of internal employees. Other applications to assist the enterprise in organizing and managing the workflow of different business processes and automating the presentation of information to users are well know to those of skill in the art.

For clarity, the above-described applications are collectively referred to herein as "enterprise applications." Enterprise applications store information that may be used to deduce the existence of a relationship or the strength of a relationship. This information, and the relationships and relationship networks that this information describes, is generally referred to herein as "relationship capital".

The relationships and relationship networks in enterprise software, however, can be difficult to access in an efficient manner. These relationships are often documented, but the relationship capital that identifies these relationships is often distributed across many disparate enterprise applications, with data that is often redundant, outdated or incomplete. Furthermore, the relationships and relationship capital are often not weighted, fail to indicate the strength of a given relationship or piece of relationship capital and do not dynamically adjust weights in response to changing data and events. Some employees, such as sales persons and other executives may also be reluctant to share relationship capital that they own, such as information regarding their personal relationships, with other employees or outside parties without retaining any control with regard to how these parties use the relationship capital. Finally, the relationship capital and relationships identified thereby are rarely aggregated, analyzed, and integrated into a relationship network that describes the full breadth of interconnections between individuals and enterprises.

These issues and concerns generally limit the amount of relationship capital that is made available and accessible through enterprise software, which negatively impacts the efficiency and productivity of an organization. Thus, business processes that the organization conducts using enterprise software, such as selling, marketing, hiring, etc., can be ineffective, uncoordinated or inefficient.

In order to overcome shortcomings and problems associated with enterprise software, embodiments of the present invention provides systems and methods for using Relationship Capital Management ("RCM") software systems to facilitate and leverage business processes.

SUMMARY OF THE INVENTION

The present invention provides methods and systems for facilitating business processes using enterprise applications, such as RCM software systems that may operate both alone and in conjunction with other enterprise applications. In some embodiments, the invention provides systems and methods, such as computer applications or solutions, which utilize or are built upon RCM software systems, as described in the previously incorporated U.S. patent application Ser. No. 11/132,159 entitled, "SYSTEM AND METHOD FOR ENFORCING PRIVACY IN SOCIAL NETWORKS," filed May 17, 2005. Specific details regarding RCM software systems may be obtained by reference to such application, which is incorporated by reference herein in its entirety. It should be noted by those of skill in the art, however, that other RCM software systems may be used in conjunction with the present systems and methods.

According to one embodiment, the invention provides a method for facilitating business processes in an enterprise application. The method comprises obtaining information regarding one or more entities, analyzing the information regarding the one or more entities to determine one or more paths between the one or more entities and one or more members of an enterprise and distributing the information regarding the one or more entities to the one or more members of the enterprise where one or more paths exist between the one or more members of the enterprise and the one or more entities.

Members of the enterprise and entities are related according to one or more social networks. These social networks may identify paths or relationships between members and entities, as well as between members. According to one embodiment, a social, or relationship, network may extend beyond the members of an enterprise to entities outside the enterprise, which is referred to as an extranet portion of the social network. It should be noted that distribution of information regarding the one or more entities to the one or more members of the enterprise may also include distribution to entities in an extranet portion of a given social network.

A given entity may include an entity that is an individual or an organization (e.g., corporation or other business organization). Obtaining information according to the present method may comprise searching for information regarding one or more entities on the basis of user supplied criteria. Result sets that are generated in response to a search for information regarding entities may be saved for future viewing. Search results that the member saves may be shared among a plurality of members of the enterprise.

The method may further comprise presenting a visual representation of the one or more entities, which may be obtained in response to a search. According to one embodiment, the visual representation is based on the information regarding the one or more entities. Relationships between members of the enterprise and entities may be provided as part of the visual representation, which is presented as paths between the members and the entities. The visual representation may also comprise presenting a strength of the one or more paths between the one or more members of the enterprise and the one or more entities. Information regarding the one or more entities may be displayed in conjunction with an enterprise application including, but not limited to, a CRM application, a SFA application, an HCM application, etc.

The entities may be prioritized, for example, subsequent to analysis of the information regarding the entities. Entities may be prioritized according to the one or more paths between the one or more members of the enterprise and the one or more entities. Similarly, prioritization may comprise prioritizing according to a strength for the one or more paths between the one or more members of the enterprise and the one or more entities. Information regarding the one or more entities may be distributed to a given member of the enterprise where a path exists to a given entity. Selecting a given one of the one or more members may comprise selecting a given one of the one or more members of the enterprise with a strongest path to the given entity.

Another embodiment of the invention for facilitating business processes in an enterprise application comprises obtaining information regarding one or more entities, analyzing the information regarding the one or more entities to determine one or more paths between the one or more entities and one or more members of an enterprise, and prioritizing the information regarding the one or more entities according to a strength of the paths between the one or more members of the enterprise and the one or more entities.

In some embodiments, the invention provides systems and methods, which may be provided in conjunction with enterprise applications, for facilitating sales or sales-related tasks by utilizing the capability of the RCM software system to determine relationships and the strength of individual and corporate relationships. For example, prospecting, or searching, for sales contacts can identify individual and corporate contacts. This information may include information about, ranking of, or a depiction of the strength or nature of relationships between members of a user's enterprise and individual or corporate contacts. Such relationships can be direct, if the user has a relationship with the contact, indirect, if the user is connected to the contact through other contacts, or various combinations of individual and corporate relationships.

According to the embodiments of the present invention, systems and methods are provided that allow business processes such as prospecting and recruiting to be performed to acquire sales leads or potential contacts based on parameters set by a user. Search results may include contact information for such potential contacts, as well as information regarding the strength or nature of the user's direct or indirect relationship with contacts. In other embodiments, systems and methods are provided that allow the user to analyze sales leads, accounts and opportunities by the strength or nature of the user's direct or indirect relationship with the contact, company or account. Embodiments are also provided that allow sales leads to be prioritized and, optionally, distributed to users. Distribution to users may be based on the strength or nature of the user's direct or indirect relationship with the lead. In some cases, the lead may be presented to the relationship owner for approval before being distributed. It is contemplated, and should be apparent to one of skill in the art, that the functionality of various embodiments may be combined to facilitate a plurality of sales and sales-related tasks, marketing and marketing-related tasks, hiring and hiring related tasks, etc.

Embodiments also provide visualization tools that to assist the user in understanding or assessing relationships. Prospecting, search results, or the analysis of leads, accounts and opportunities may optionally be shared with other users, or may be shared in a limited fashion. Efficiency and effectiveness of tasks are increased as compared, for example, to typical methods for obtaining and utilizing sales leads, prioritizing leads and accounts, as well as optimizing the distribution of leads.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 9 is a user interface illustrating a pop-up window for sharing a search result set according to one embodiment of the present invention;

FIG. 11 is a user interface illustrating a set of saved searches for analysis with one or more social networks according to one embodiment of the present invention;

FIG. 14 is a user interface illustrating prioritization of entities according to another embodiment of the present invention;

DETAILED DESCRIPTION OF THE PREFERRED EMBODIMENT

In the following description of the various embodiments of the invention, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
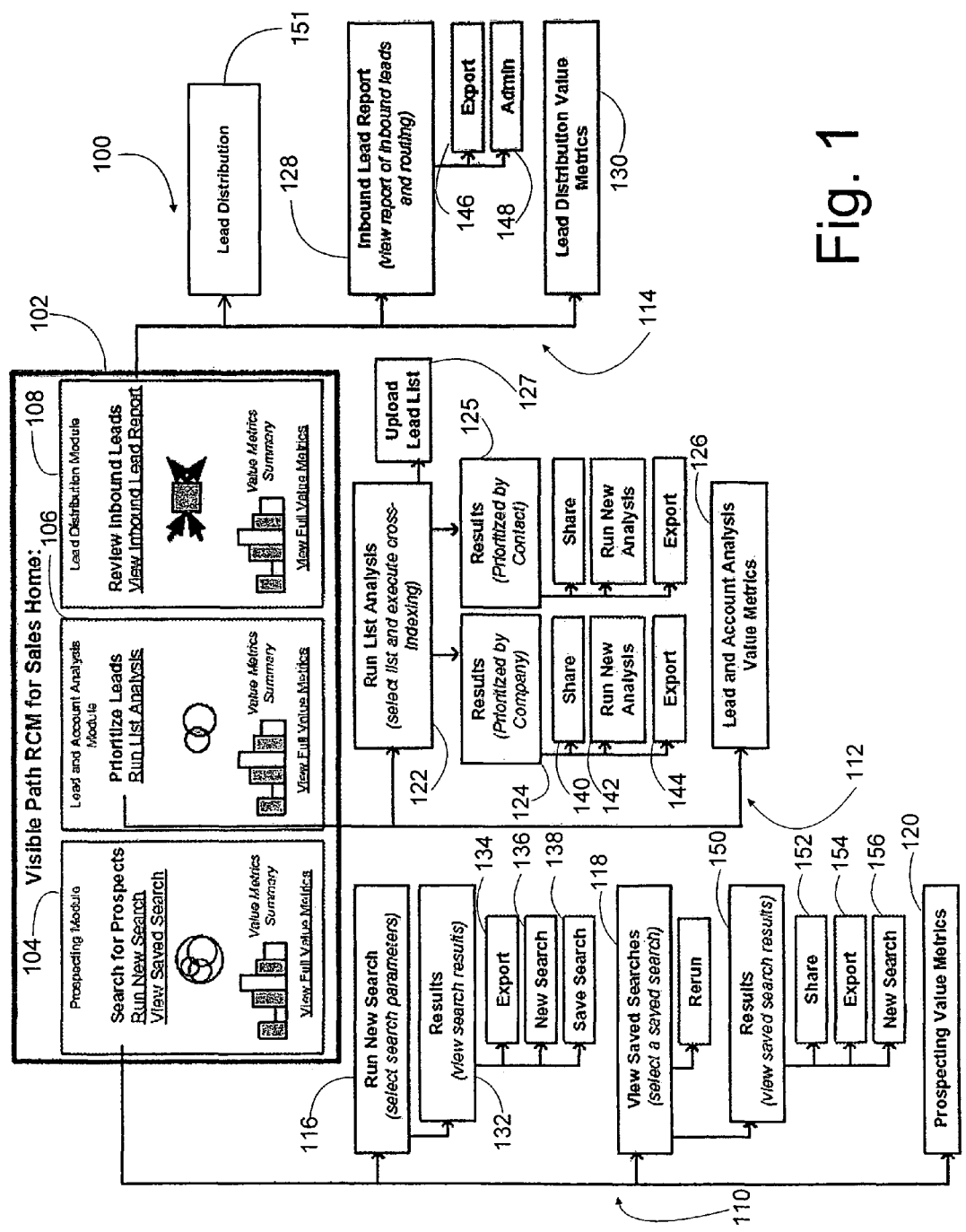
FIG. 1 is a system diagram illustrating a functions executed by one or more software modules for facilitating business processes using a social network according to one embodiment of the present invention.

FIG. 1 is a system diagram 100 illustrating a series of functions according to one embodiment of the invention for using an enterprise application, such as the RCM software system, for facilitating a business process. An exemplary business process according to the present invention is facilitating sales and sales-related tasks. The method 100 depicted includes routines provided by three software modules: a prospecting module 104, a lead and account analysis module 106, and a lead distribution module 108. Each of the software modules 104, 106, 108 comprises program code for executing a number of functions 110, 1112, 114, which each include one or more steps and may include multiple options or parameters for customization of the functions 110, 112, 114. Each function 110, 112, 114 also includes routines 120, 126, 130 for calculating and viewing metrics regarding a given business process, as well as detailed information associated with a given metric.

As FIG. 1 illustrates, the prospecting module 104 may include utilizing, at least in part, capabilities of the RCM software system to obtain or mine information regarding one or more social networks for information regarding entities contained within the social networks. For example, this may include obtaining or searching for potential corporate, other business or individual sales or sales-related contacts, such as potential customers or clients. The information provided to the RCM software system may come, at least in part, from enterprise software applications including, but not limited to, CRM, SFA, HRM, etc, as well as one or more third party data sources. The prospecting module 104 includes a run new search function 116, which may include one or more steps for setting search parameters and may be used to search for entities. The run new search function 116 includes a view search results function 132, which allows a user to view the result set of a search.

After searching for or otherwise obtaining a result set comprising information regarding one or more entities, a user may export the results 134 to an external application, perform a new search 136, save a search or results of a search, or both 138. Exemplary information regarding entities that the prospecting module 104 obtains may include contacts or potential contacts for sales, sales messaging, or sales-related messaging, including advertising messaging and other forms of sales-related communications. In some embodiments, contact and relationship information from enterprise software applications is mined by the RCM software system to obtain information regarding one or more entities to which one or more members of an enterprise maintains a path, which may be a direct relationship between a given entity and a given member, or may comprise a number of intermediate members between the two. The method 100 may also use information calculated by the RCM software system regarding the one or more entities, such as relationship strength information. Exporting results 134 may include, for example, saving the results, or information regarding the entities, in a system or location external to the RCM software system, such as saving data to a file or data store to later be uploaded into a spreadsheet or other analysis application.

Searches and search results may be saved 118, internal or external to the RCM software system, for later use or revision. A function is provided for retrieving result sets 150 from saved searches, e.g., information regarding entities that fall within the scope of a query or uploaded from an external data source, such as a third party data source. Routines are also provided to prepare the result set for sharing among a plurality of members of an enterprise 152, export the result set to a an external file or data store 154, which may be loaded into an enterprise application for analysis, as well as rerun the saved search 156 to determine if additional entities fall within the scope of the search or, similarly, whether entities previously within the result set no longer fall within the scope of the query.

The lead and account analysis module 106 may include utilizing, at least in part, capabilities of the RCM software system to utilize path and path strength information, which may include information regarding relationships between entities and members of an enterprise, as well as relationships between members of the enterprise, as contained in one or more social networks. The lead and account analysis module 106 may also utilize other parameters set by the other routines of the method 100, as well as a user, to rank, prioritize, or otherwise determine or estimate the relative value or strength (e.g., weight) of the relationships between an enterprise (or members thereof) and a given set of one or more entities. Information regarding entities may be provided to the RCM software system by one or more enterprise software applications and may be retrieved from one or more third party data sources.

As FIG. 1 further illustrates, the run lead and account analysis module 106 may provide functions that include, but are not limited to, run list analysis 122, which may include presentation of results prioritized by company 124 or contact 125, sharing of results with other members of the enterprise or third parties 140, running a new analysis 142, and exporting the results prioritized 144 by the module 122. Sharing of results 140 may include a user opting to share results, such as a prioritized list of entities, with other users, or selected or authorized users. Sharing may be limited generally, or limited with regard to certain members of the enterprise, such as by limiting information or details regarding a given entity or list of entities to users with sufficient relationship strength with regard to the given entity or entities. The run lead and account analysis module 106 may also include a lead and account analysis value metrics function 126, which provides interfaces and routines for the calculation and display of metrics regarding a list of prioritized entities. Furthermore, a user may upload lists of leads from external applications or files 127.

The lead distribution module 108 may include lead distribution 151, an inbound lead report function 128 and a lead distribution value metrics function 130. An inbound lead includes any information regarding an entity that may be useful in facilitating a business process, e.g., a sales lead may comprise information regarding an entity that the entity provides through a sales questionnaire at an enterprise. Inbound lead information may also include information obtained from third party data sources, the RCM software system or other enterprise applications. The inbound lead report function 128 may include an export function 146 and administration functionality 148.

A lead distribution function 151 processes inbound lead information, which includes information regarding one or more entities, to determine a given member of the enterprise to receive the information regarding the one or more entities. According to one embodiment of the present invention, the given member of the enterprise who has the strongest relationship with the entity receives the information regarding the entity for use in facilitating a business process, e.g., following up on a sales lead. The determination may be made on the basis of path information between the entity and one or more member of an enterprise that the RCM software system maintains, which may be based in whole or in part on information contained in enterprise software applications or provided from third-party data sources. Alternatively, priority information may be provided to one or more third parties for distribution.

Figure 2:
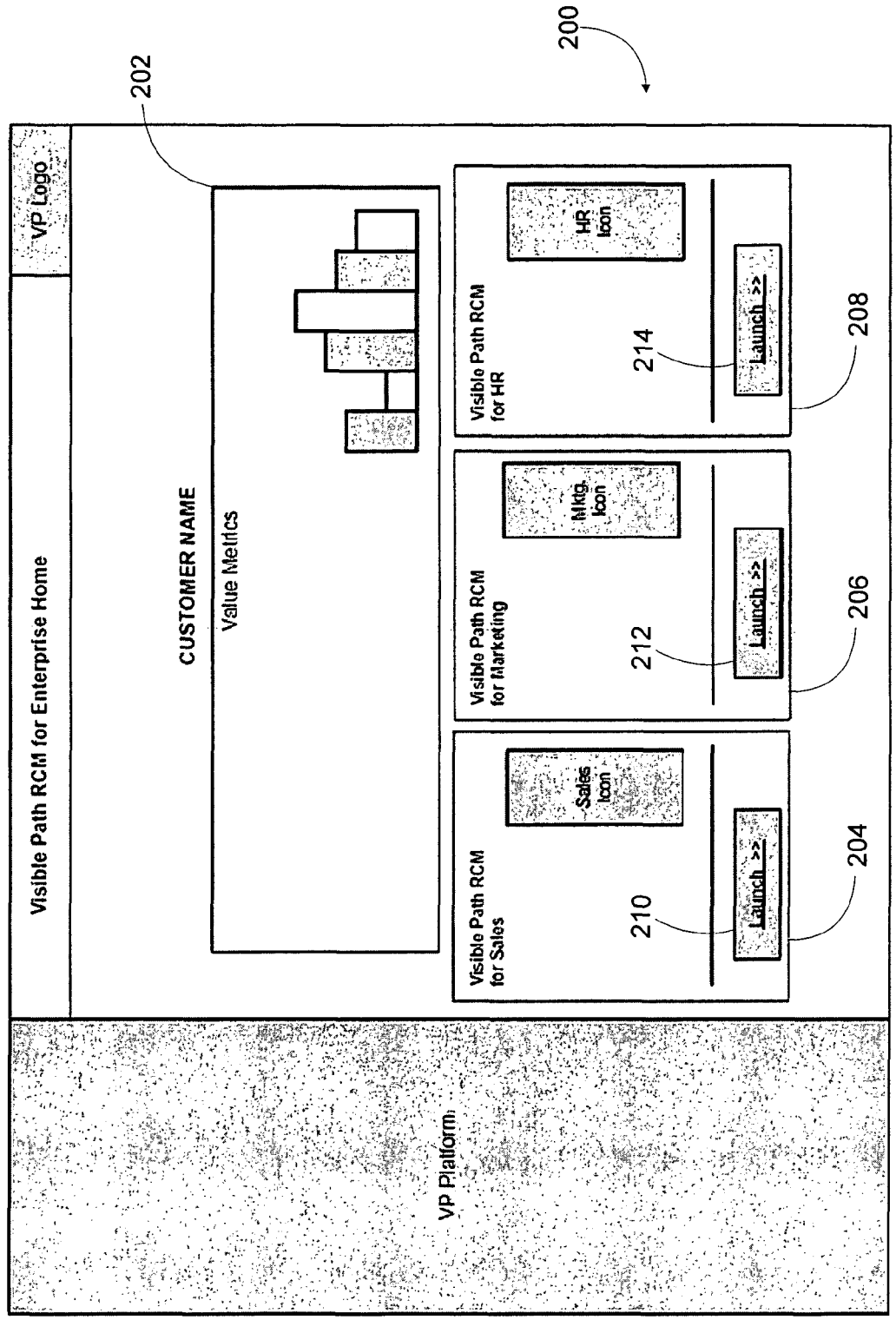
FIG. 2 is a user interface illustrating access to software modules for facilitating business processes according to one embodiment of the present invention.

FIG. 2 is a user interface 200 according to one embodiment of the present invention that provides access software modules for facilitating business processes. According to the present embodiment, the interface provides access to routines for facilitating sales 204, marketing 206 and human resources 208. The interface 200 may be a web page that a web browser renders. The web page, for example, may be a web page presented by an RCM software system. As depicted, a value metrics display 202 is provided, which may show, for example, metrics regarding business processes. Controls 210, 212 and 214, respectively, are provided to launch sales 204, marketing 206 and HR 208 routines.

Figure 3:
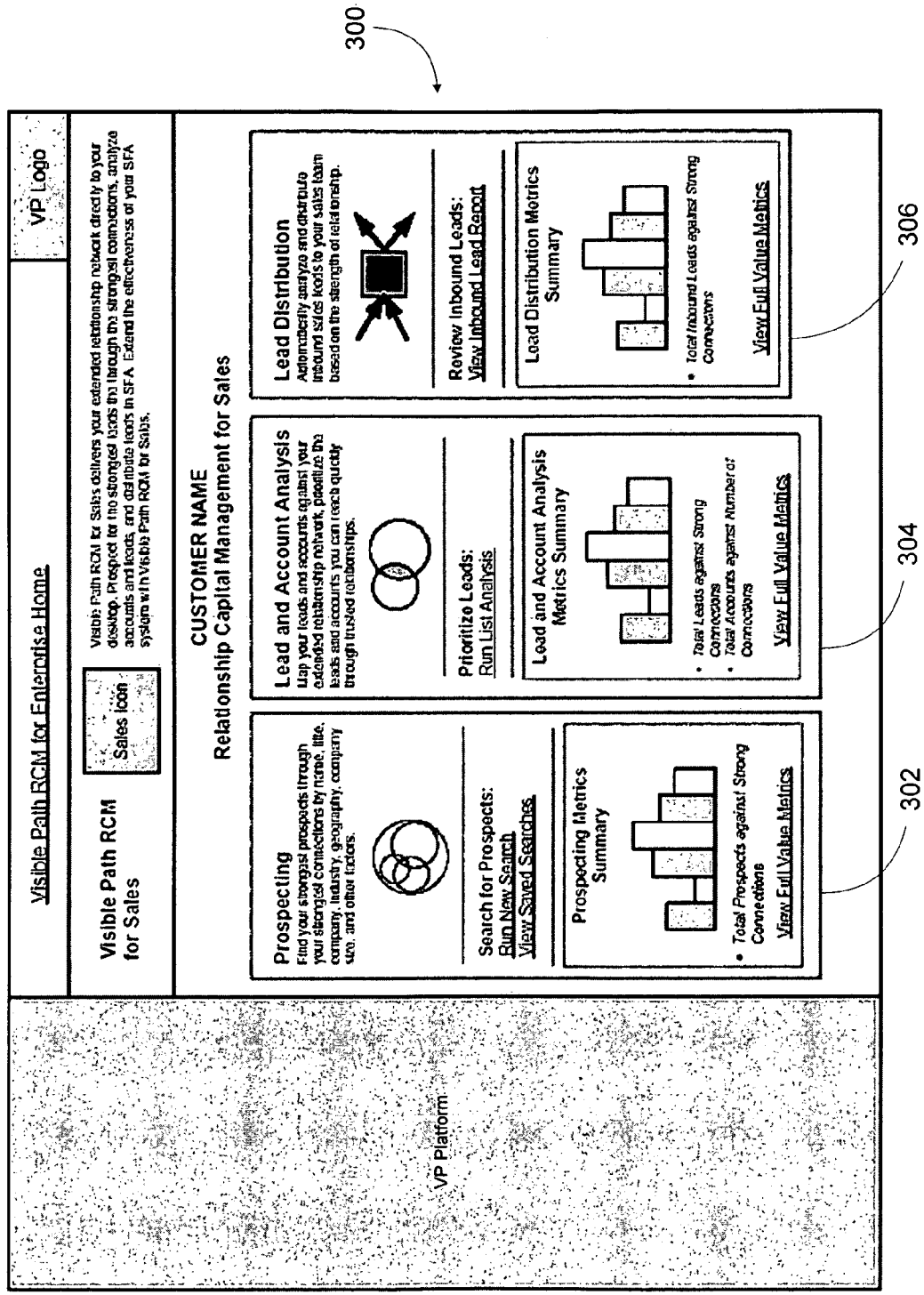
FIG. 3 is a user interface illustrating access to software modules for facilitating business processes according to one embodiment of the present invention.

FIG. 3 is a user interface 300 according to one embodiment of the invention that provides an interface to top-level functions of the sales facilitation routine. Such a user interface may be a web page retrieved from a server, e.g., from the RCM software system, in response to the selection of a sales icon from the user interface illustrated at FIG. 2. Options and links are provided to allow access to functions such as prospecting 302, lead and account analysis 304 and lead distribution 306, as discussed with regard to FIG. 1.

Figure 4:
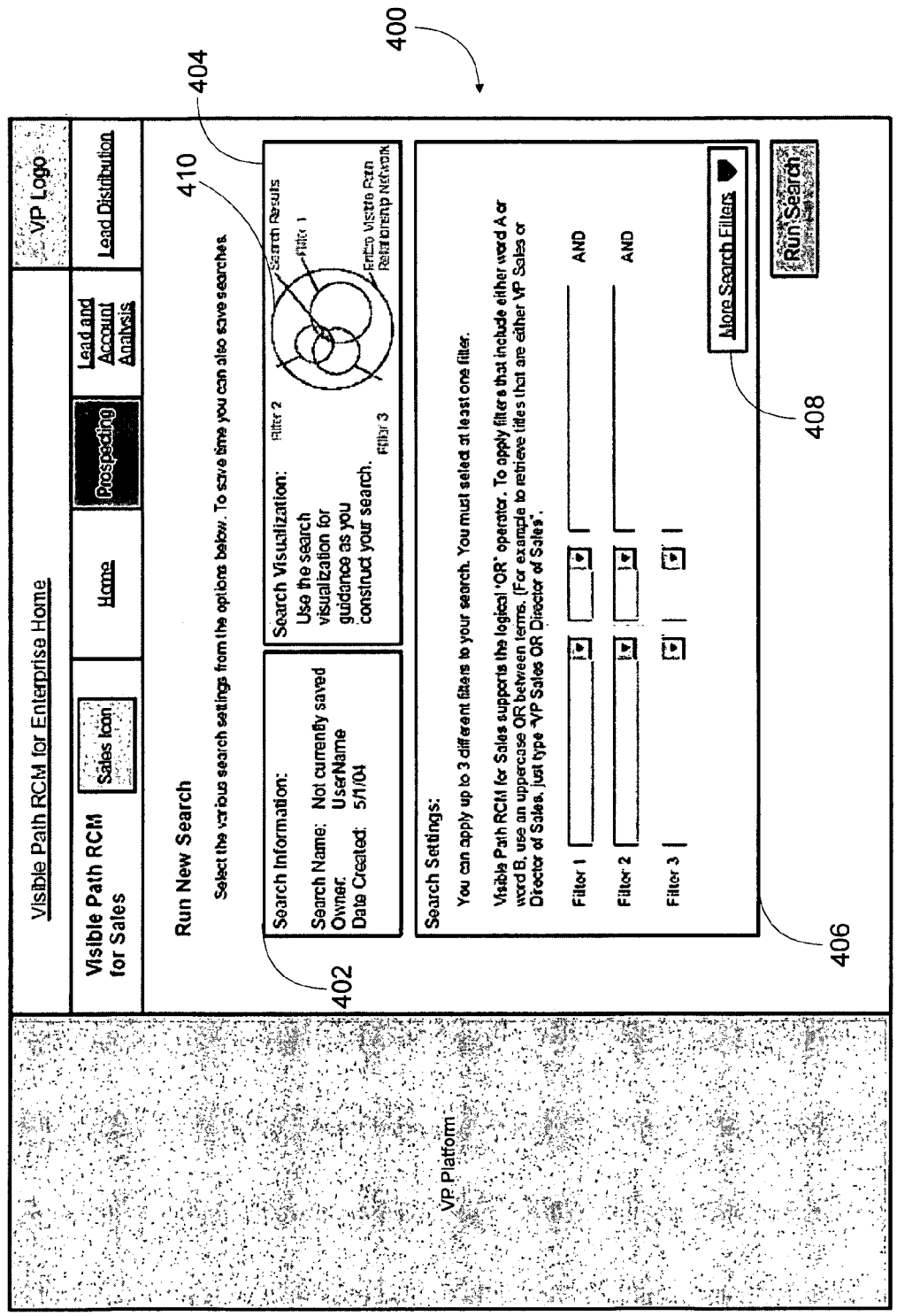
FIG. 4 is a user interface illustrating access to search controls and search information according to one embodiment of the present invention.

FIG. 4 is a user interface 400 according to one embodiment of the present invention that provides controls that allow for the construction of a query. Execution of the query invokes a search for one or more entities that fall within the scope of the query. The new search function may be made available through the prospecting module illustrated at FIG. 1. Displays or interfaces are provided for information describing the search 402 and search visualization 404. Search visualization is calculated on the bases of one or more search settings 406. For example, as depicted, a Venn diagram 410 is utilized. Circles comprising the Venn diagram represent groups of entities that satisfy one or more filters specified by the search settings 406. The sizes of circles 410 may vary, for example, with the size of the group of entities falling within the scope of a given search criteria. Overlap between circles represents potential entities that satisfy more than one of the different search criteria. An exterior circle may represent an entire relationship network. Other embodiments and manners of depictions, filtering, presentation, etc., such as bar diagrams, are known to those skilled in the art and may also be used.

A user may enter search criteria in the search settings interface 406 whereby a user defines criteria/value pairs for searching through one or more relationship networks that the RCM software system provides to locate information regarding entities that are responsive to the search. The search may further utilize information from other enterprise applications, as well as third-party data sources. Where the user requires controls to provide additional criteria/value pairs for a search, the interface provides a control 408 for the display of additional criteria/value controls. According to one embodiment, a given number of instances of the control are presented by the interface in response to selection of the control 408. Alternatively, a single instance of the control is presented in the interface each time the user selects the control 408.

Figure 5:
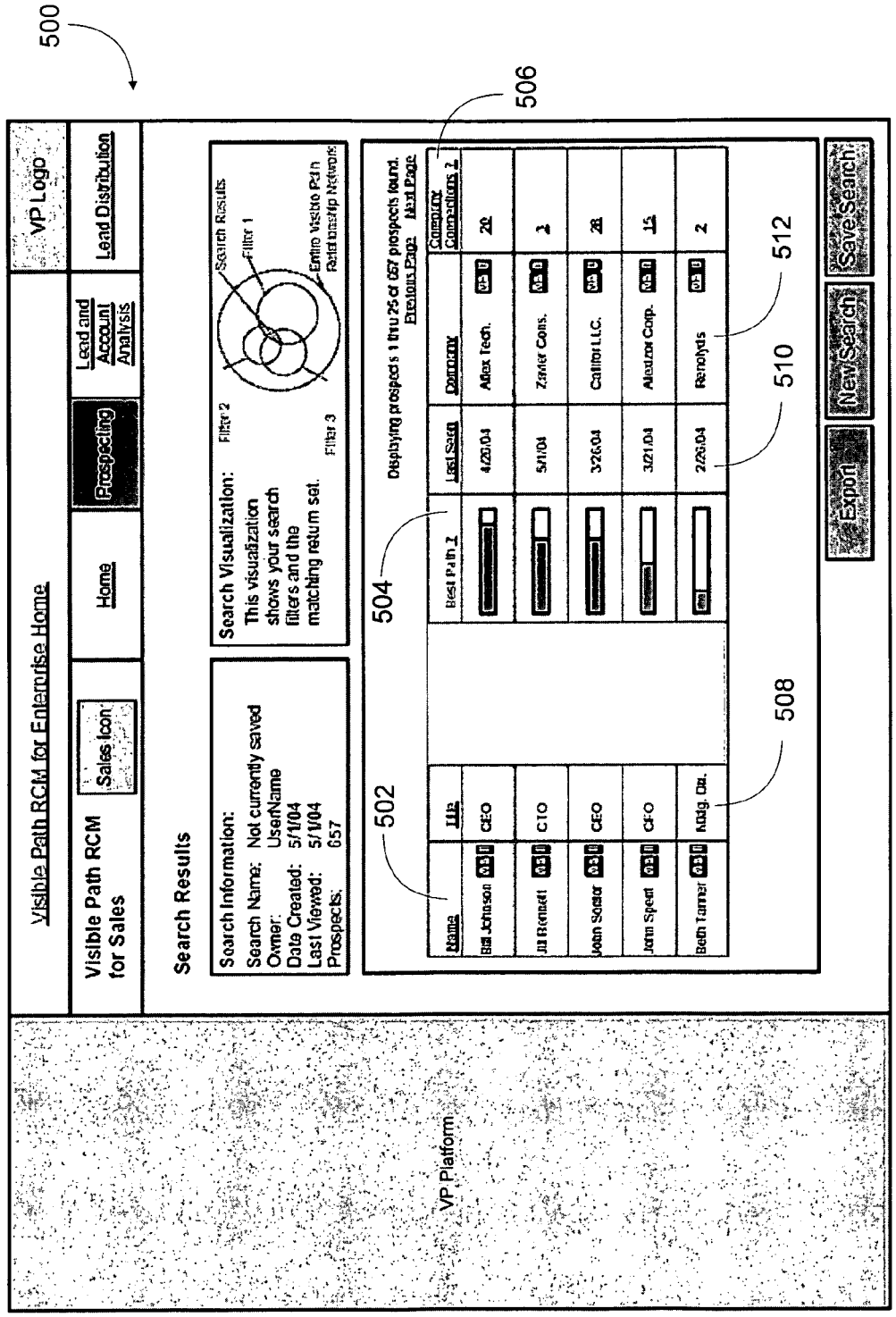
FIG. 5 is a user interface illustrating search results according to one embodiment of the present invention.

When the user executes a new search the user interface illustrated at FIG. 5 is presented according to one embodiment of the invention. The interface of FIG. 5 presents information regarding entities that fall within the scope of the search provided by the interface of FIG. 4. The search results may include a list of information regarding individual or corporate entities 502, 504, 506, 508, 510, 512, e.g., contact information responsive to a given search. In some embodiments, links may be provided to obtain additional information regarding a given entity, or may only be provided to the extent a user is allowed access to such information. A best path column 504 provides a graphical display, such as a bar diagram, representing the strongest path between a given entity and a member of the enterprise. Similarly, a company connection column 506 informs the member of the number of connections between the member and a given entity. Path information for a given entity may be calculated by or in conjunction with the RCM software system and information regarding the entities may be obtained from the RCM software system, other enterprise applications and third-party data sources.

Figure 6:
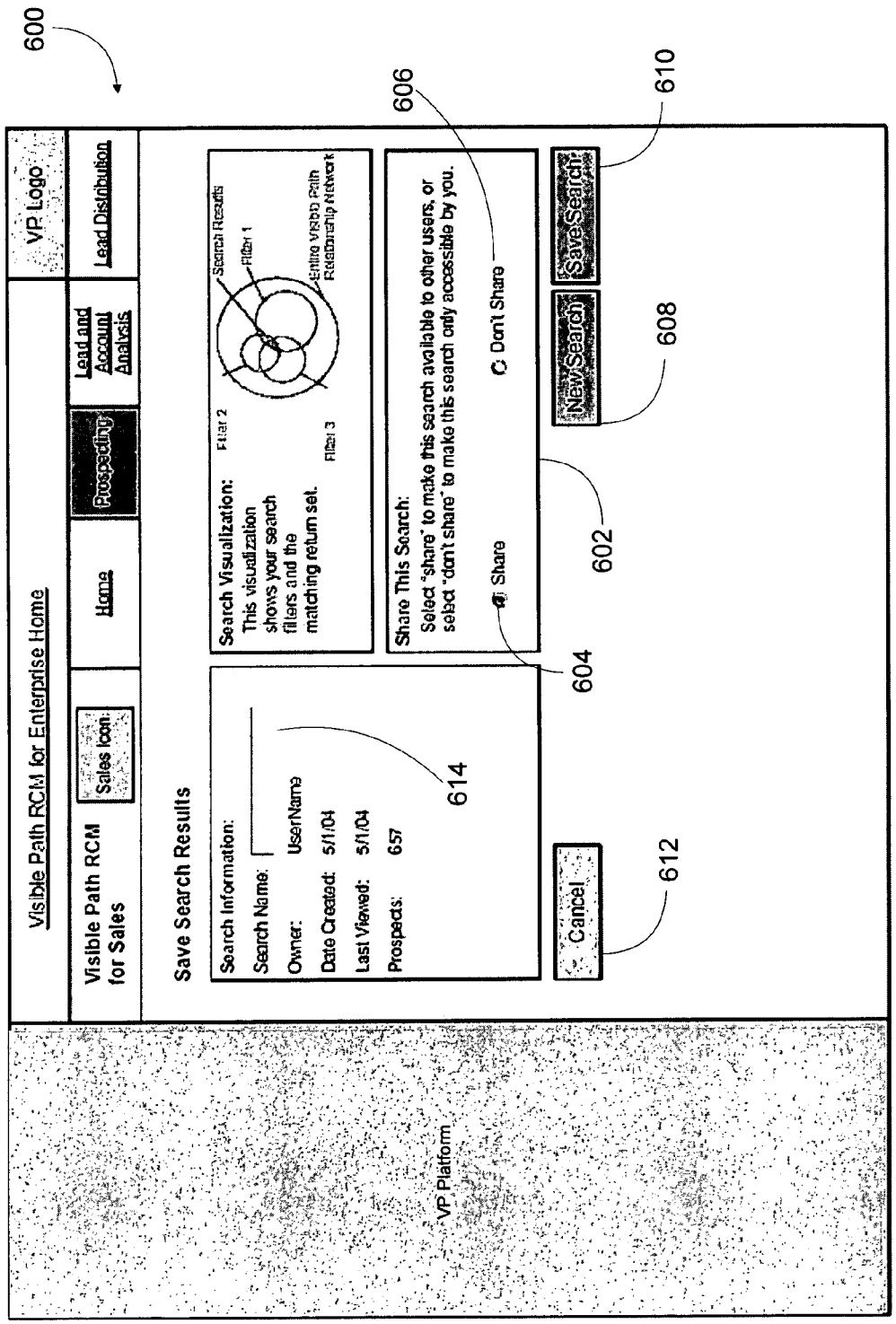
FIG. 6 is a user interface illustrating controls for saving a search according to one embodiment of the present invention.

FIG. 6 is a user interface 600 according to one embodiment of the invention for saving and sharing searches. The display format 600 includes an interface 602 for sharing searches among a plurality of members of an enterprise. Using this interface 602, a user may set a parameter to share the results of a search 604. Alternatively, the user may elect to set a parameter to not share 606 the results of a search, causing the results to remain private and only be available to the member saving the search. When a member saves a search, a text field 614 allows the user to associate a name with the saved search. Selecting a save control 610 causes the information regarding the one or more entities in the result set, along with a name for the result set, to be written to a persistent storage device. The interface 600 also provides controls to execute a new search 608 according to the interface of FIG. 4, as well as cancel the save process 612 and return to the search result display of FIG. 5.

Figure 7:
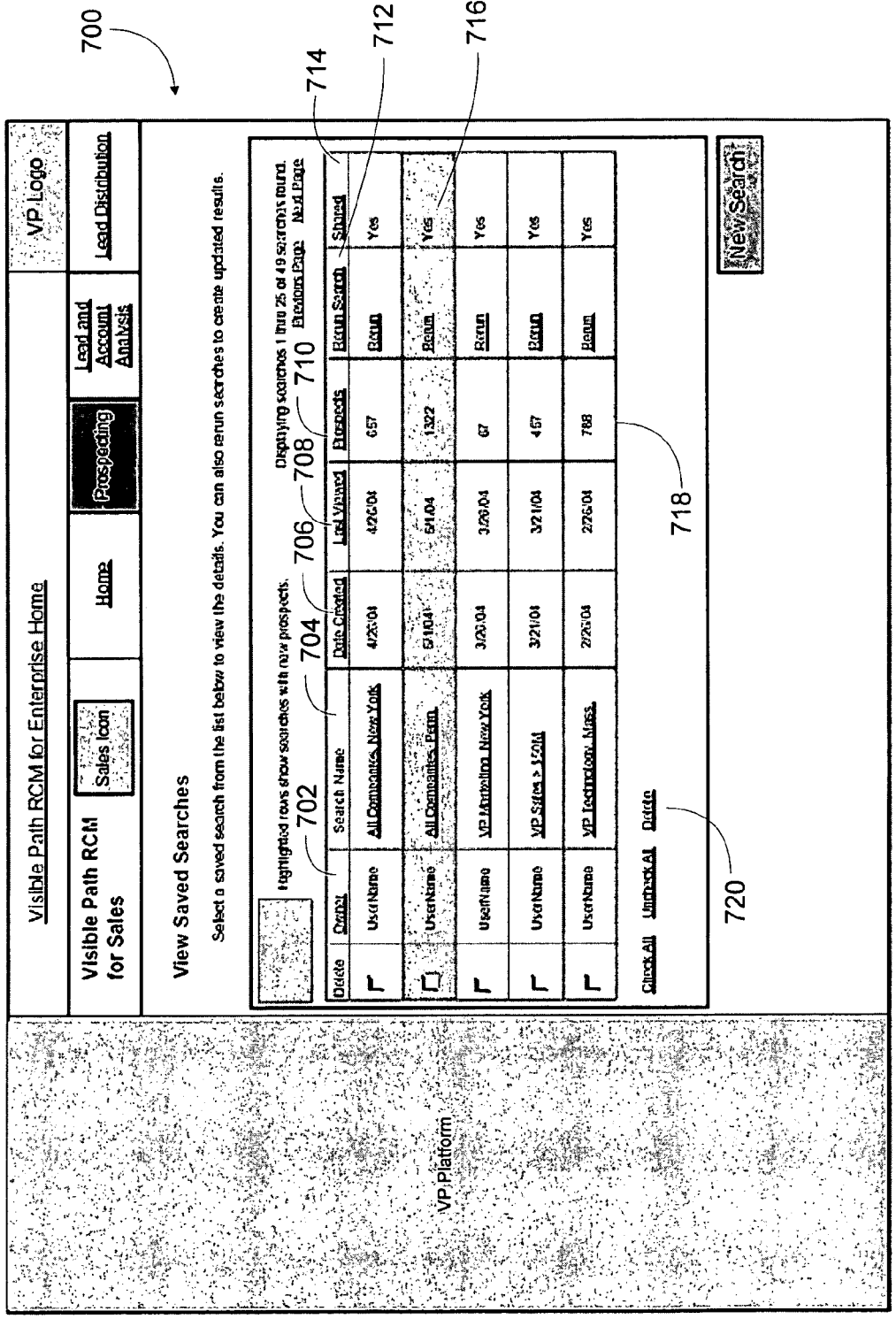
FIG. 7 is a user interface illustrating saved searches according to one embodiment of the present invention.

FIG. 7 is a user interface 700 according to one embodiment of the invention that presents one or more saved searches. A user may select a saved search 716 from a list of saved searches 718 and view the results of the individual search, which may include links to additional information regarding the entities falling within the scope of the search. Users may also modify search results, such as by deleting entries 720, or may modify a search 712 and run the modified search to obtain new results. The exemplary list of save searches 718 presents information regarding the searches including, but not limited to, the member of the enterprise that owns a search 702, the name of a search 704, the date a saved search was created 706, the date a search was last viewed 708, the number of entities falling within the scope of a saved search 710 and whether a search is shared among a plurality of members of an enterprise 712.

Figure 8:
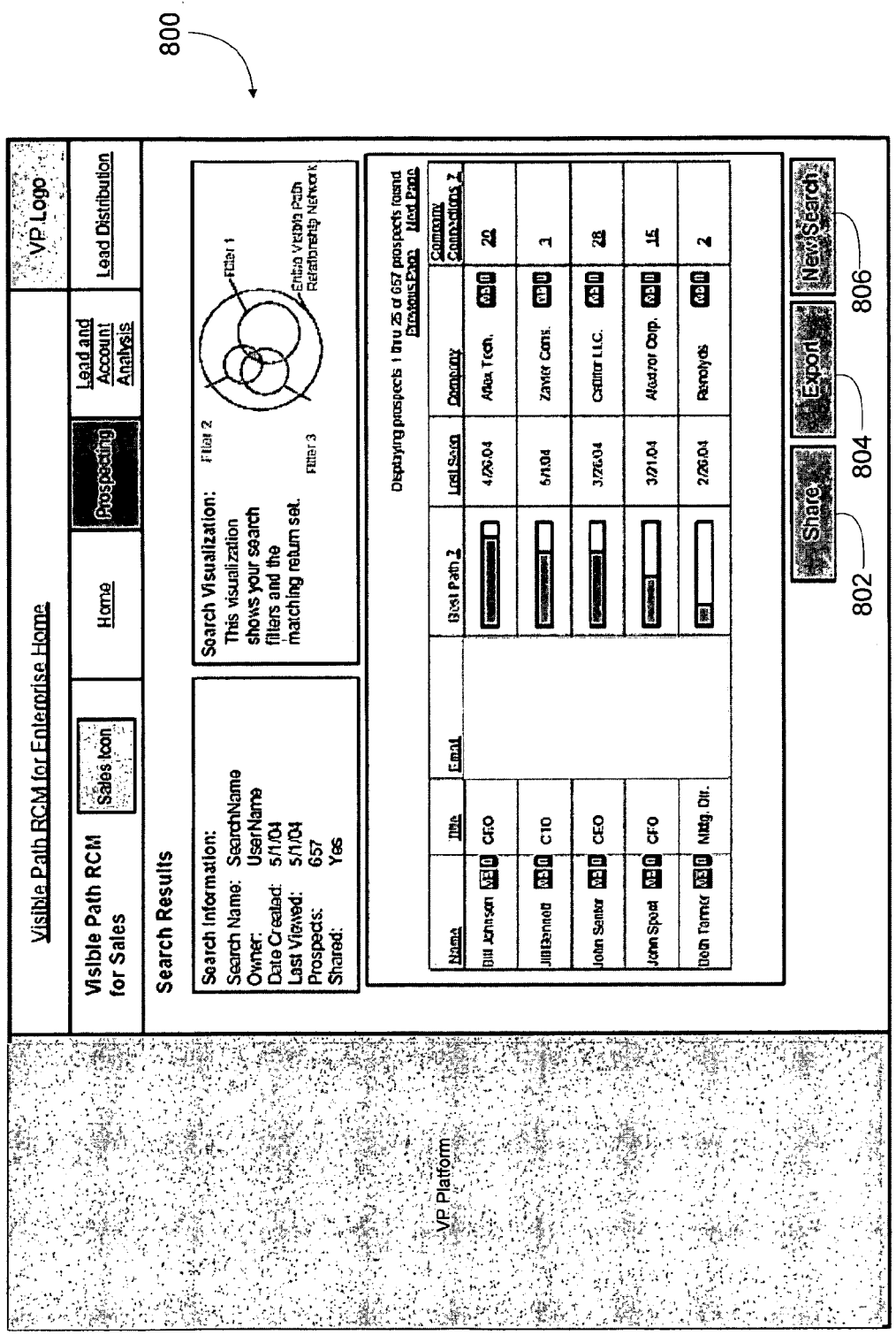
FIG. 8 is a user interface illustrating saved search results according to one embodiment of the present invention.

FIG. 8 is a user interface 800 according to one embodiment of the invention for viewing saved results of a given search, which provides the information regarding entities that are part of a saved search a user selects using the interface provided by FIG. 7. The interface provides share 802, export 804 and new search 806 controls that allow a member of an enterprise to share the saved search results with other members of the enterprise, export the results to an external application or file, or run a new search, respectively. According to the present embodiment, the interface for viewing saved searches presents information regarding entities presented part as a returned search result set illustrated at FIG. 5.

Figure 9:
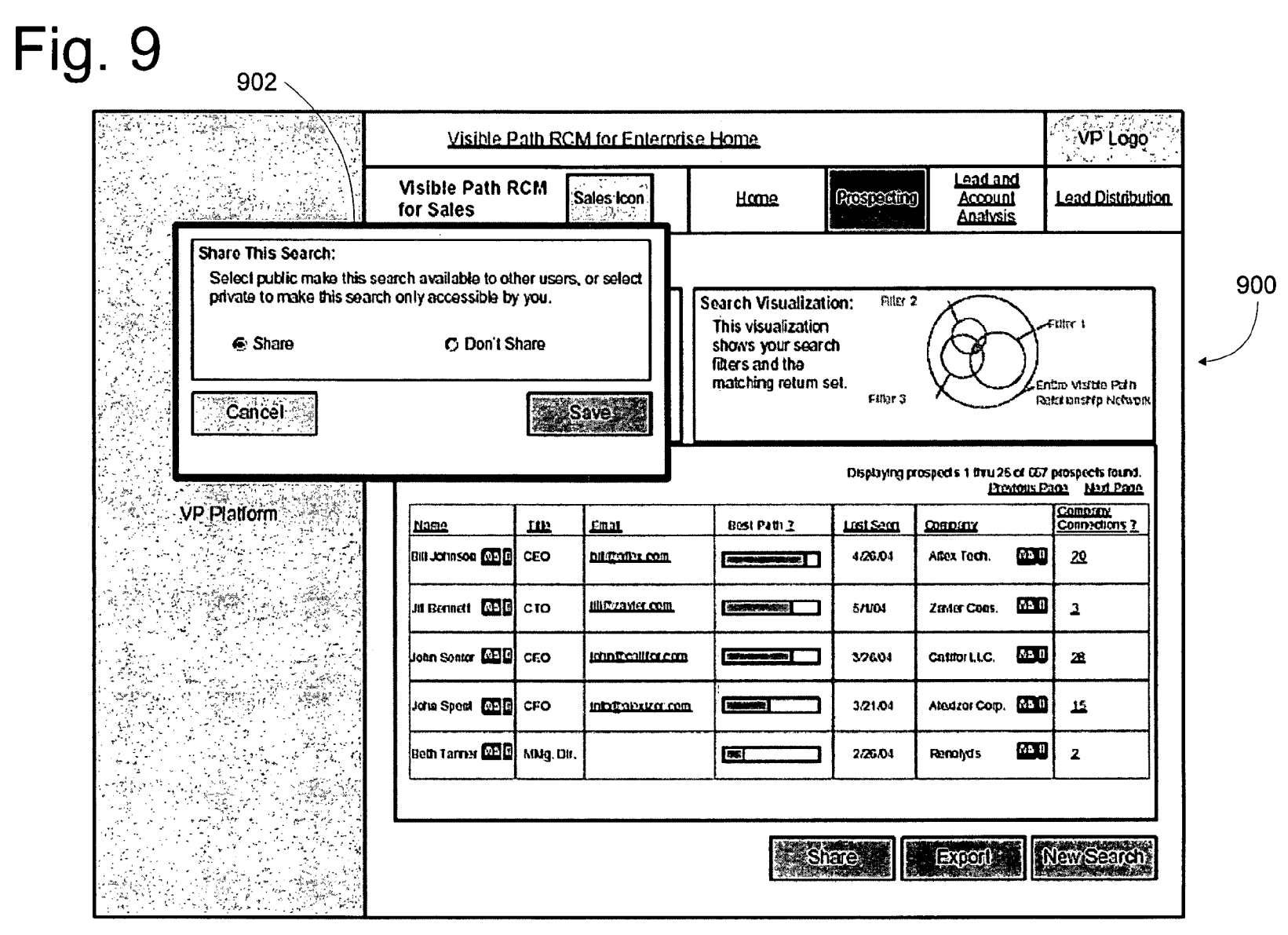

When a member of the enterprise decides to share a search, the member is presented with the user interface of FIG. 9. According to the embodiment of the invention illustrated at FIG. 9, the controls for sharing a search are presented in a pop-up window. When a user opts to share the search results, share this search interface 902 is provided as is discussed with reference to FIG. 6.

Figure 10:
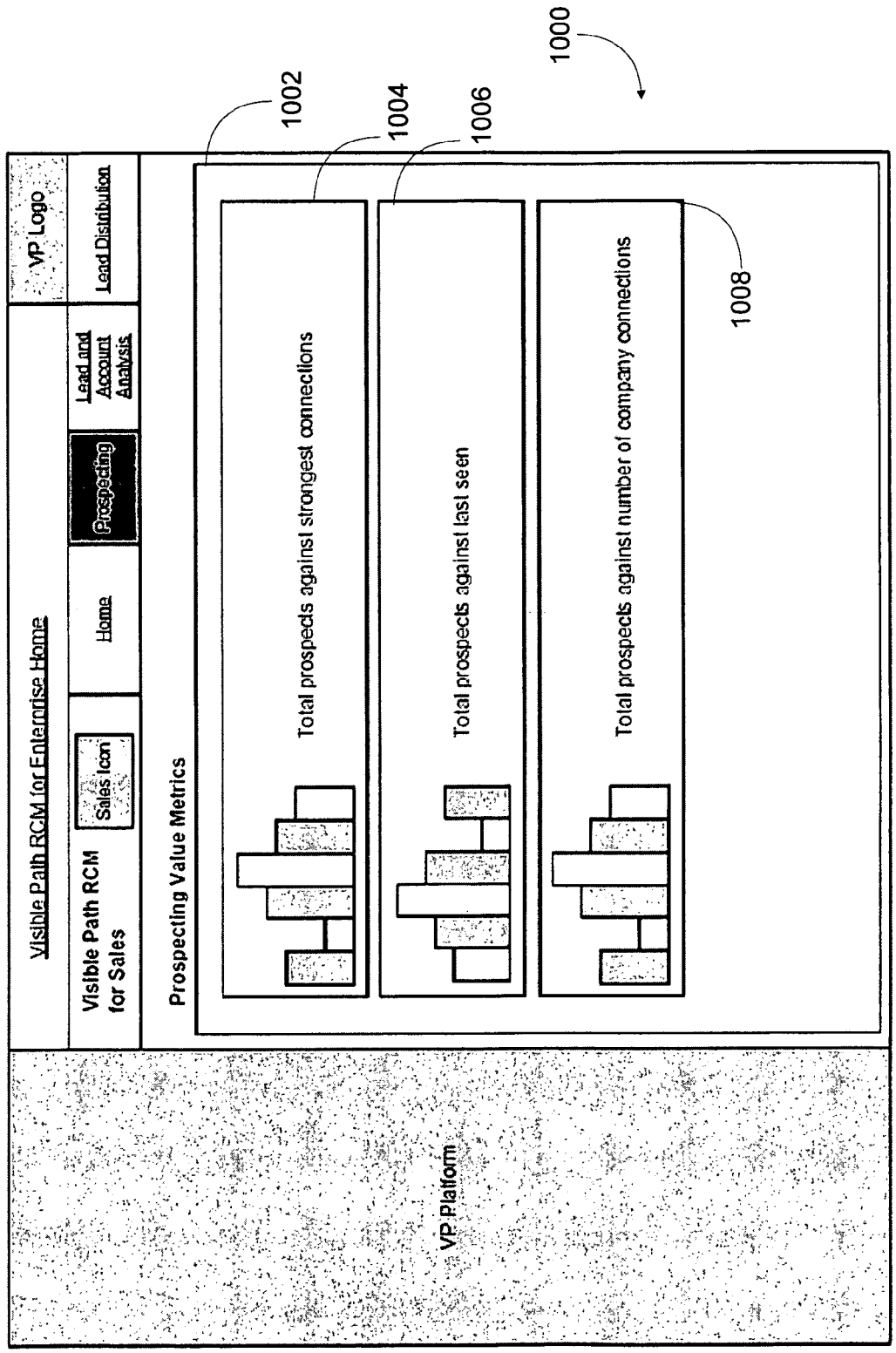
FIG. 10 is a user interface illustrating business process metrics according to one embodiment of the present invention.

FIG. 10 is a user interface 1000 according to one embodiment of the invention for accessing prospecting value metrics.

Prospecting value metrics 1002 are provided through the interface 1000. Prospecting may include or refer to utilizing methods or systems according to the present invention, which may operate in conjunction with the RCM software system, to search for or mine information regarding one or more entities available to the RCM software system, other enterprise applications or third party data sources. The searched, mined or otherwise obtained data includes information regarding one or more entities e.g., potential sales contact information, which may also include relationship and relationship strength information.

As is illustrated in FIG. 10, the prospecting value metrics display 1002 includes bar graphs representing total prospects against strongest connections 1004, total prospects against last seen 1006, and total prospects against number of company connections 1008, as calculated by the RCM software system. Although the illustration of FIG. 10 utilizes bar graphs, those of skill in the art should readily appreciate the ability to use other graphing techniques, e.g., pie charts, etc. Furthermore, other metrics regarding entities are contemplated as falling within the scope of the invention.

FIG. 11 is a user interface 1100 according to one embodiment of the invention that provides controls for use in lead prioritization. Prospects, leads, account lists, etc., all of which comprise information regarding entities, may be analyzed to obtain or determine additional information or formulate graphical or other displays relating to such information regarding the entities. Analysis may include comparing and analyzing entities and information regarding entities against one or more relationship networks, optionally using filter criteria, to prioritize the information regarding the one or more entities.

Figure 12:
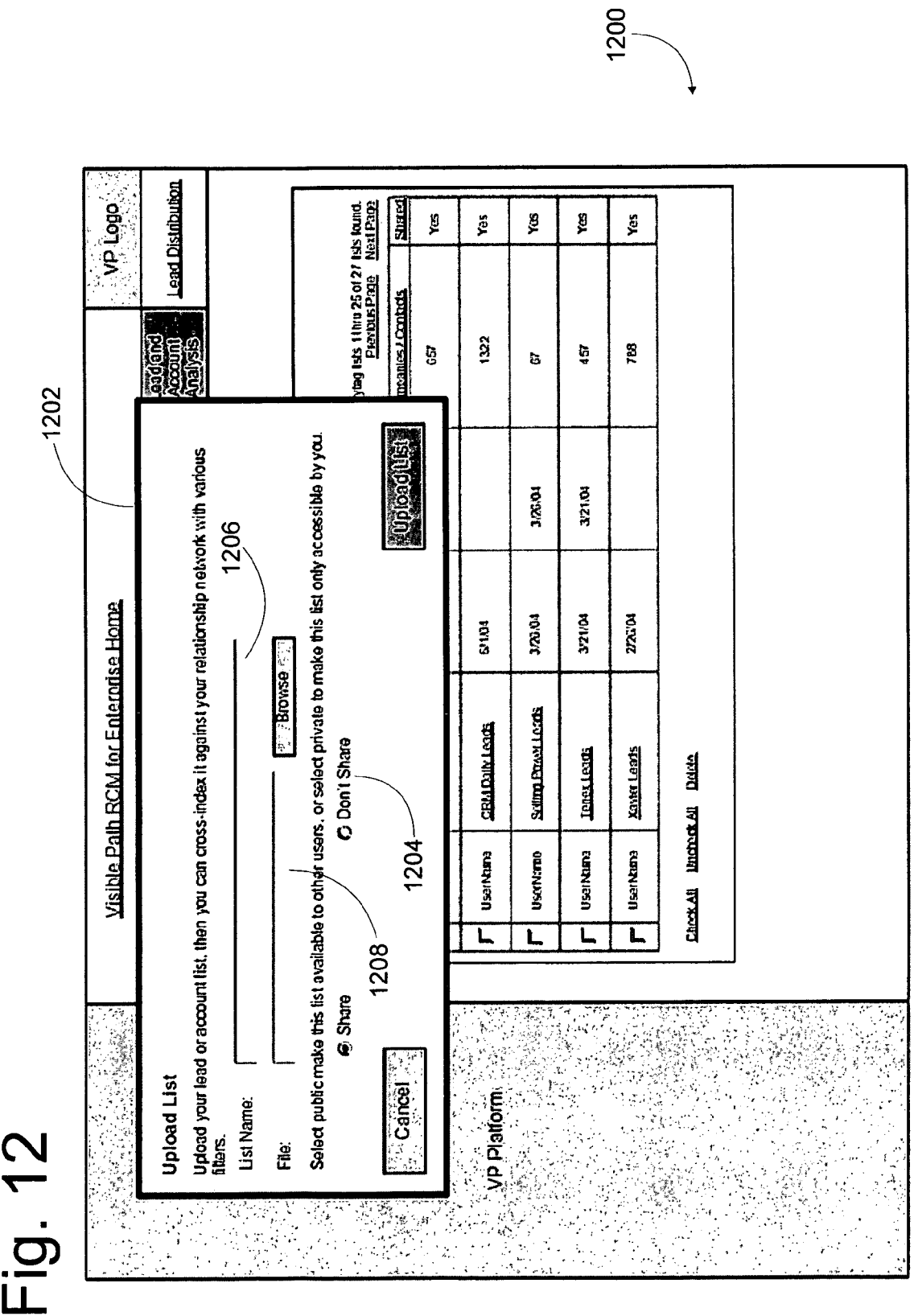
FIG. 12 is a user interface illustrating a pop-up window for uploading a set of entities for analysis with one or more social networks according to one embodiment of the present invention.

As is discussed above, information regarding one or more entities may be obtained from third-party data sources. FIG. 12 is a user interface 1200, according to one embodiment of the invention that allows for information regarding one or more entities to be uploaded for analysis. The pop-up window 1202 allows a member of an enterprise to upload information regarding one or more entities for prioritization based on relationship information maintained by the RCM software system. Lists of information regarding entities may be uploaded using an upload list interface 1202, which allows the user to provide a name 1206 and location 1208 for a data file that is to be uploaded. The interface 1202 also provides sharing options 1204 that may be set at the time the member uploads the list. A member uploads a list of information regarding one or more entities and the system cross-indexes the list against one or more relationship networks, e.g., an enterprise relationship network or the member's relationship network.

Figure 13:
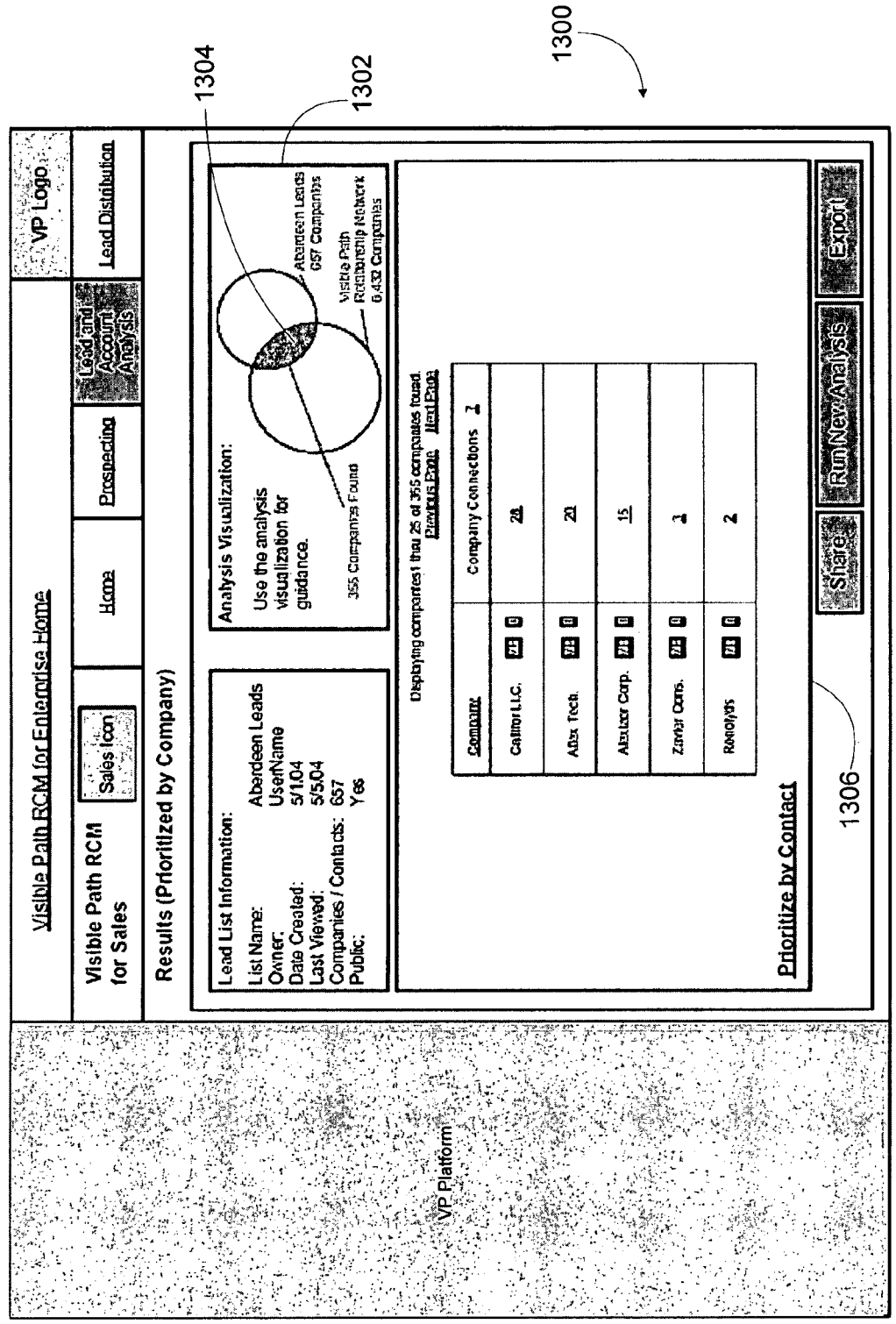
FIG. 13 is a user interface illustrating prioritization of entities according to one embodiment of the present invention.

FIG. 13 is a user interface 1300 according to one embodiment of the invention for viewing prioritized lists of information regarding corporate or business entities. Lists of information regarding the one or more entities may be prioritized by various criteria and presented accordingly, such as by number of contacts for a given entity has with members of an enterprise or an enterprise itself. The exemplary Venn diagram display 1302 provides analysis visualization after filtering a set of information regarding one or more entities using an employee contacts filter ("Aberdeen leads") and a corporate filter ("Visible Path Relationship Network"). The darkened portion 1304 represents the intersection of the two criteria, e.g., entities that satisfy both filter conditions. According to the illustration of FIG. 13, corporate entities are prioritized by the interface. Similarly, FIG. 14 is a user interface 1400 according to one embodiment of the invention for viewing prioritized lists of entities that are individuals. This information is similar to that provided by the user interface illustrated in FIG. 13, except information is prioritized by individual 1402, as opposed to by company.

Figure 15:
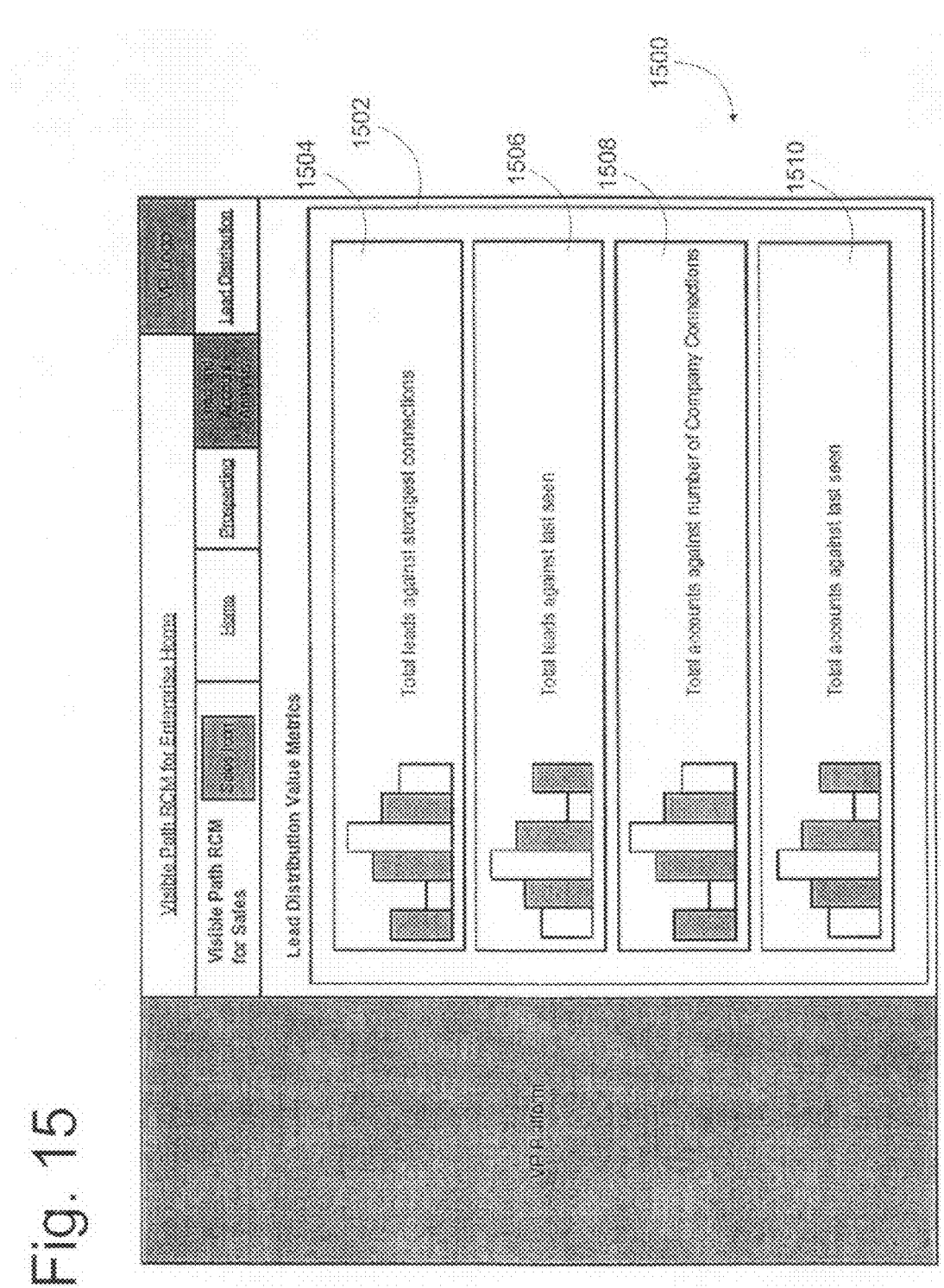
FIG. 15 is a user interface illustrating presentation of value metrics for business processes according to one embodiment of the present invention.

FIG. 15 is a user interface 1500 according to one embodiment of the invention for presentation of lead and account analysis value metrics. A display 1502 according to the present embodiment includes bar graphs to depict total leads against strongest connections 1504, total leads against last seen 1506, total accounts against number of company connections 1508, and total accounts against last seen 1510, as calculated by the RCM software system. As was explained with regard to FIG. 10, although the illustration of FIG. 15 utilizes bar graphs, those of skill in the art should readily appreciate the ability to use other graphing techniques, e.g., pie charts, etc., as well as the calculation and inclusion of additional value metrics.

Figure 16:
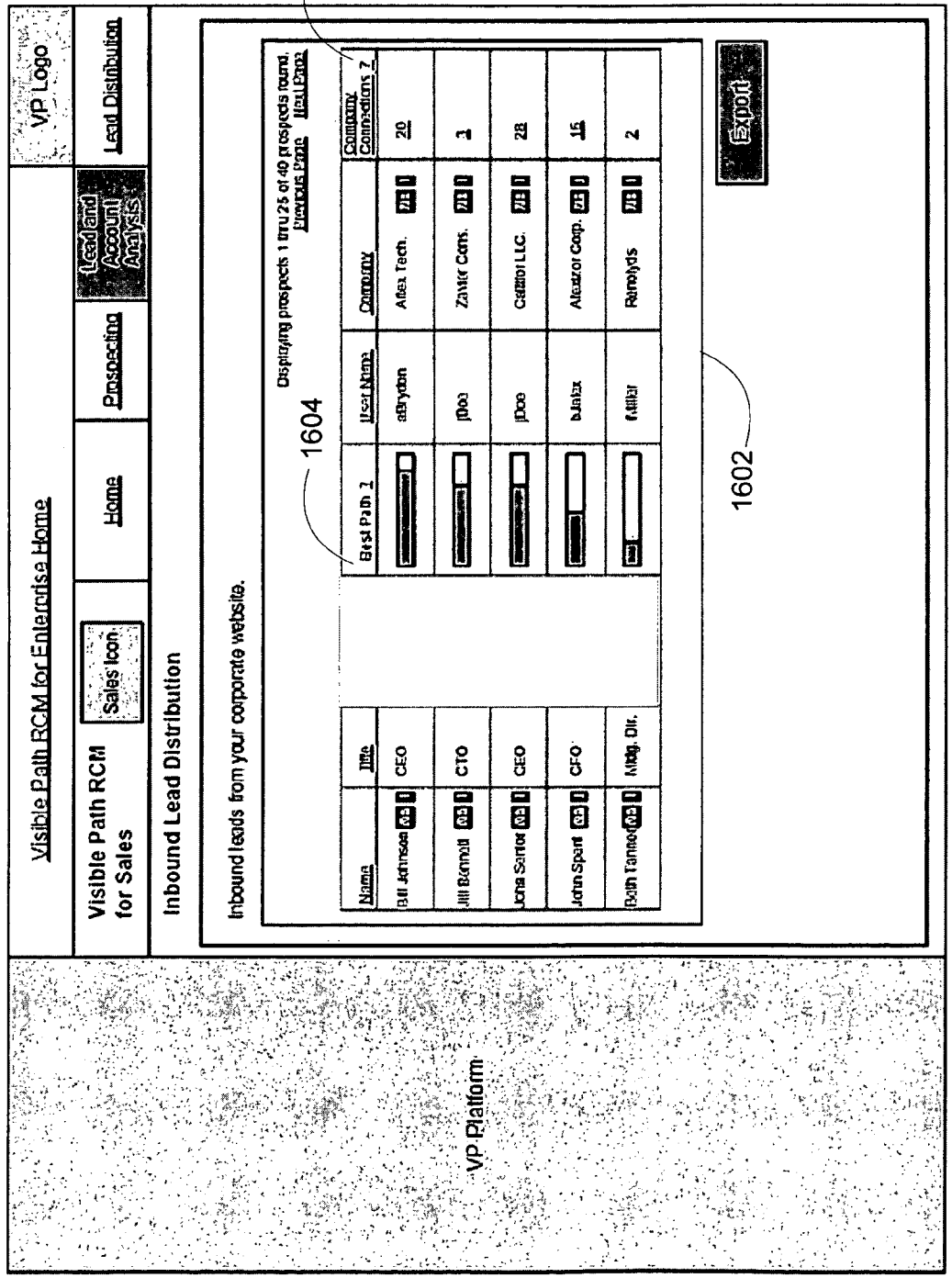
FIG. 16 is a user interface illustrating inbound lead distribution information for a business process according to one embodiment of the present invention.

FIG. 16 is a user interface 1600 according to one embodiment of the invention for viewing inbound lead distribution. Inbound leads may include, for example, entities who enter contact information from a Web site of the member's enterprise, or who otherwise provide information to request additional information regarding a given business process, e.g., sales information. The inbound lead information is cross-referenced against the relationship network information that the RCM software system maintains to determine relationship information (direct and indirect paths between members and entities) and information regarding the strength (e.g., weight) of those relationships, provided that they exist. This information may be used to route an inbound lead to an appropriate contact within the enterprise, e.g., the member of the enterprise with the strongest relationship with the inbound lead. Displayed distribution information 1602 may include best path information 1604, number of connections of the entity maintains with members of the enterprise 1606, and other information regarding a given entity or entities.

Figure 17:
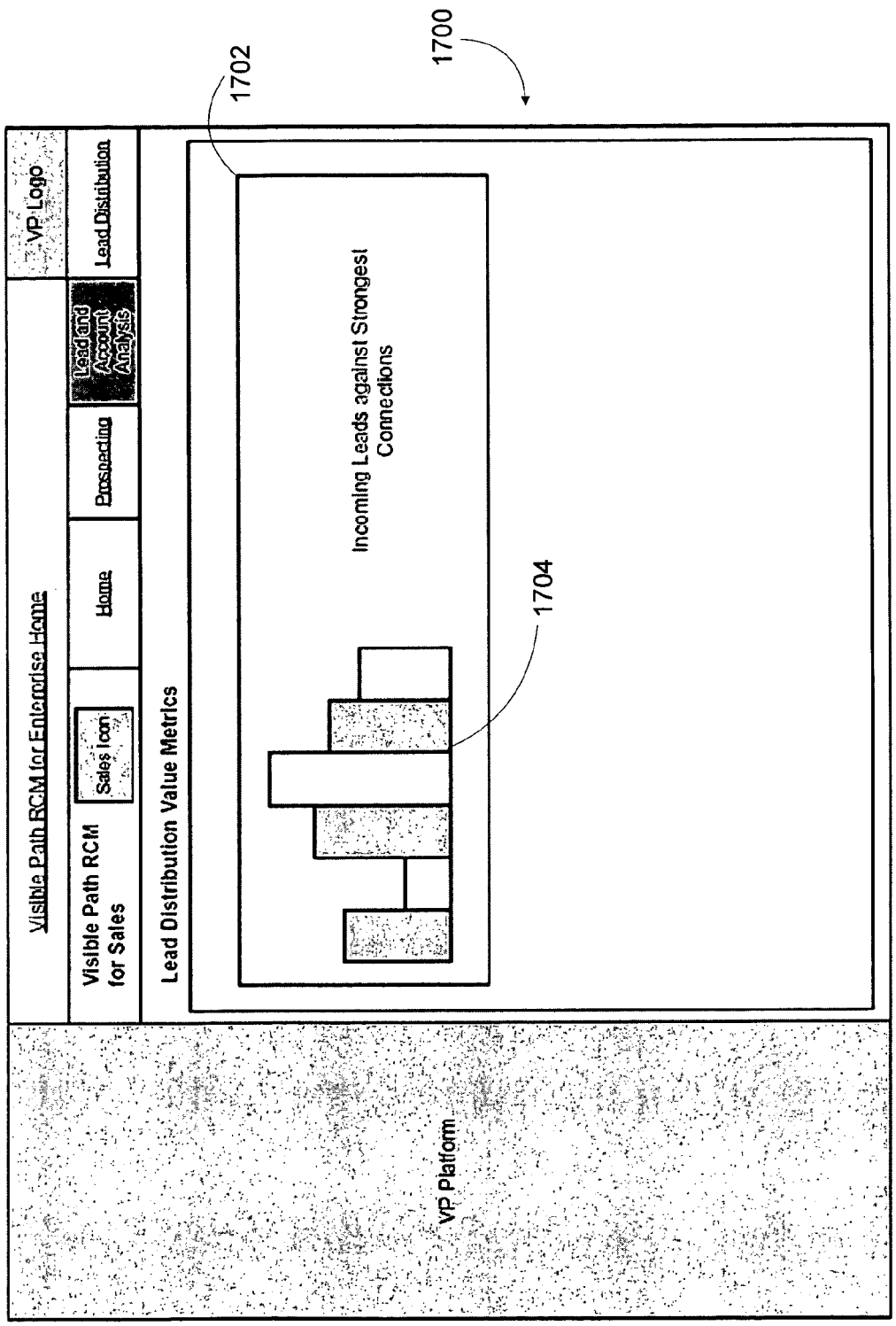
FIG. 17 is a user interface illustrating presentation of lead distribution metrics for a business process according to one embodiment of the present invention.

FIG. 17 is a user interface 1700 according to one embodiment of the invention for presenting lead distribution value metrics. A lead distribution value metrics display 1702 provides a bar graph display to represent incoming leads against strongest relationship connections 1704, which may be calculated by the RCM software system. Although the illustration of FIG. 17 utilizes bar graphs, those of skill in the art should readily appreciate the ability to use other graphing techniques, e.g., pie charts, etc.

Figure 18:
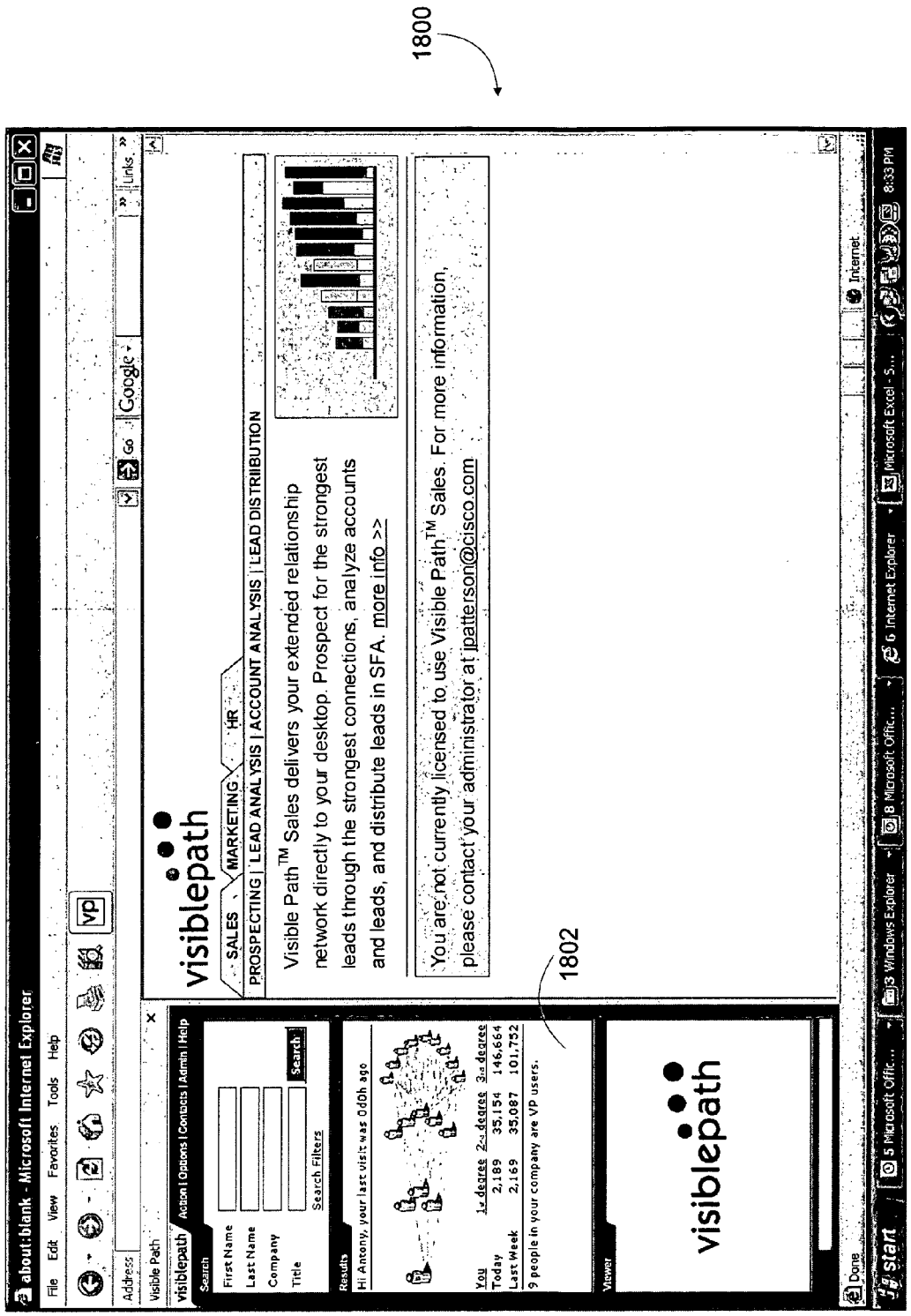
FIG. 18 is a user interface illustrating access to software modules for facilitating sales, marketing and human resources business processes according to one embodiment of the present invention.

FIG. 18 is a user interface 1800 according to one embodiment of the invention with a sales tab selected. Display 1802 presents relationship information; which may be obtained from or displayed by the RCM software system. As depicted, the display format is a web page, such as sales web page accessible via a home page provided by an enterprise application such as the RCM software system.

Figure 19:
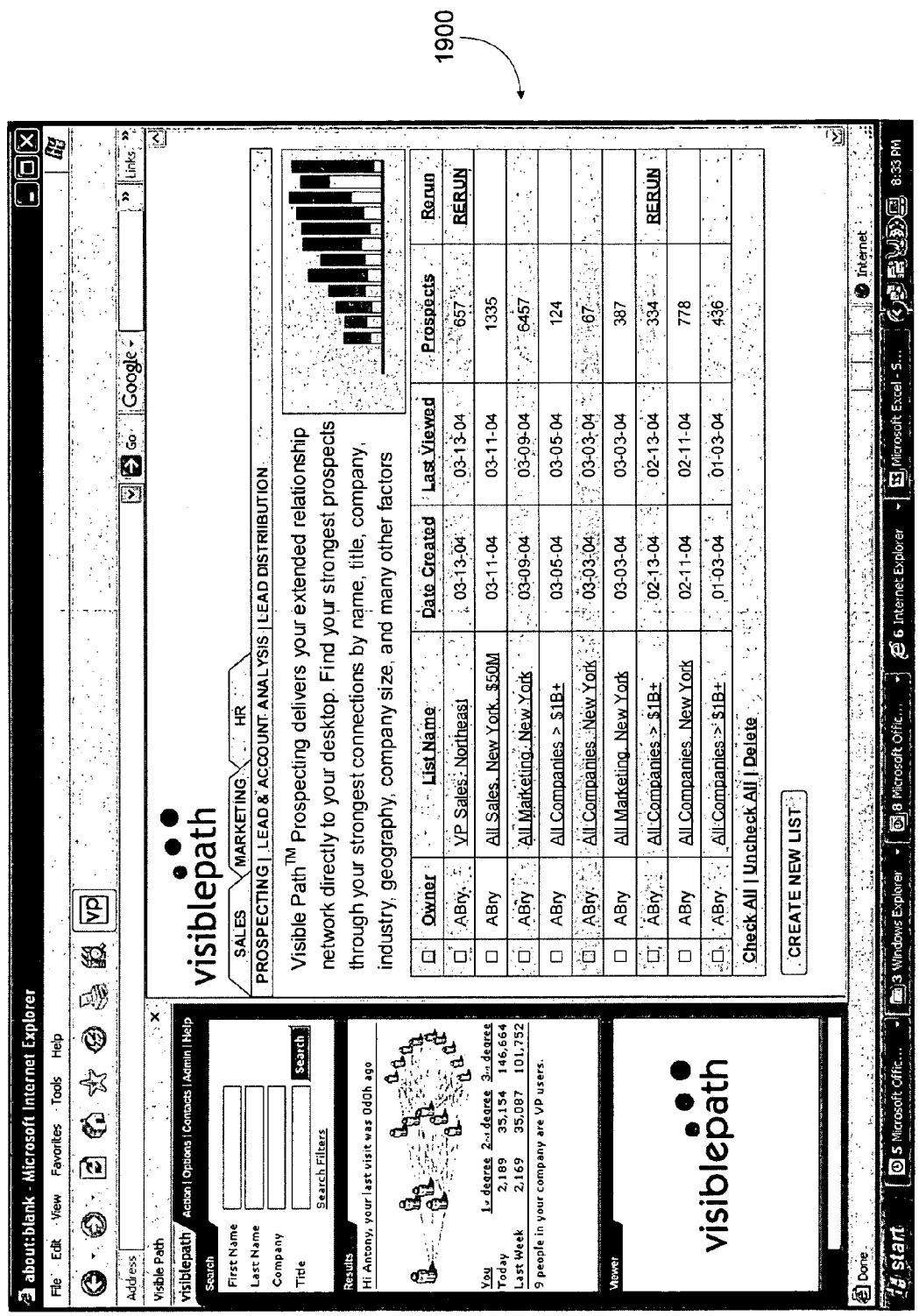
FIG. 19 is a user interface illustrating access to software modules for facilitating a sales business process according to one embodiment of the present invention.

A number of functions are available within the sales module. FIG. 19 is a user interface format 1900 according to one embodiment of the invention with a prospecting heading selected, which is a search function. As depicted, the display format is a web page, such as a prospecting web page accessible via a home page provided by an enterprise application such as the RCM software system. This interface display contains saved search information similar to that described with regard to FIG. 7.

Figure 20:
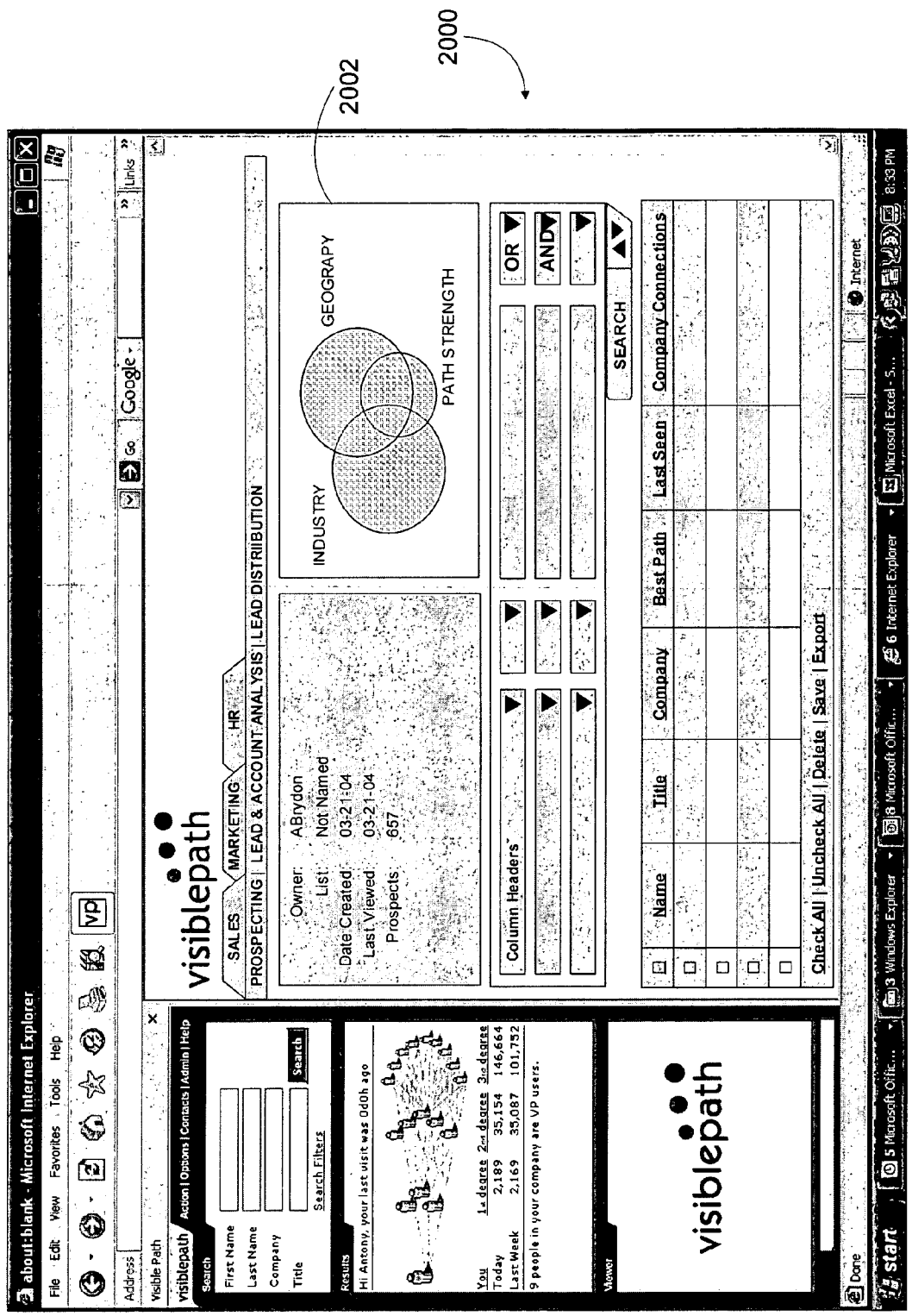
FIG. 20 is a user interface illustrating access to search controls and search information according to one embodiment of the present invention.
Figure 21:
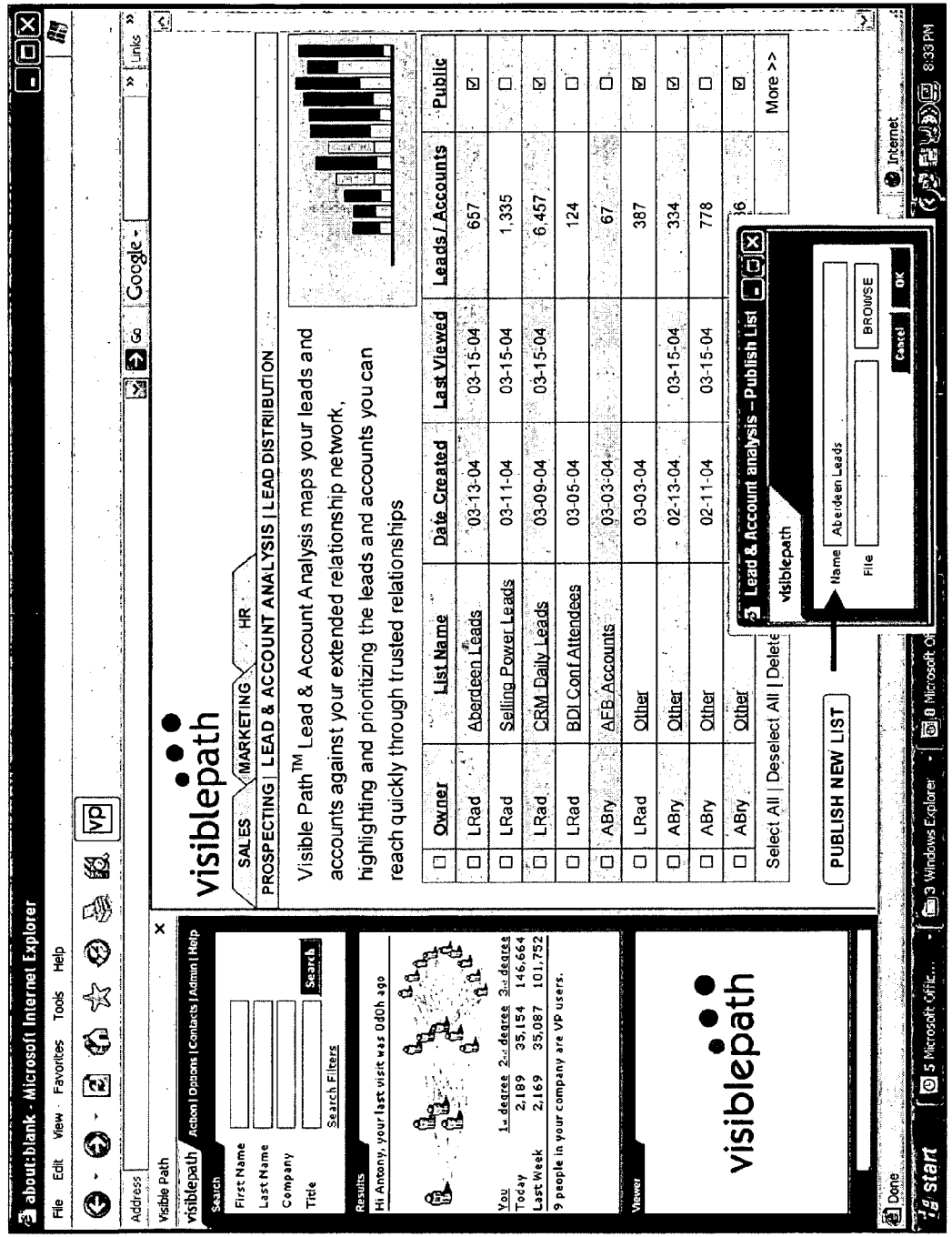
FIG. 21 is a user interface illustrating access to a software module for selecting saved searches according to one embodiment of the present invention.

FIG. 20 is a user interface 2000 according to one embodiment of the invention illustrating an interface for defining criteria for a search. A Venn diagram display 2002 may be used to depict information in a manner similar to that described with reference to FIG. 4. As depicted, filters include industry, geography, and path strength filter parameters. This interface display contains controls for supplying search criteria for conducting searches similar to that described with regard to FIG. 4. FIG. 21 is a user interface 2100 according to one embodiment of the invention illustrating the information regarding one or more entities returned as the result of a search. Leads and accounts can be cross-referenced against a user's extended relationship network, which can include highlighting or prioritizing leads that a user can reach through a network of relationships.

Figure 22:
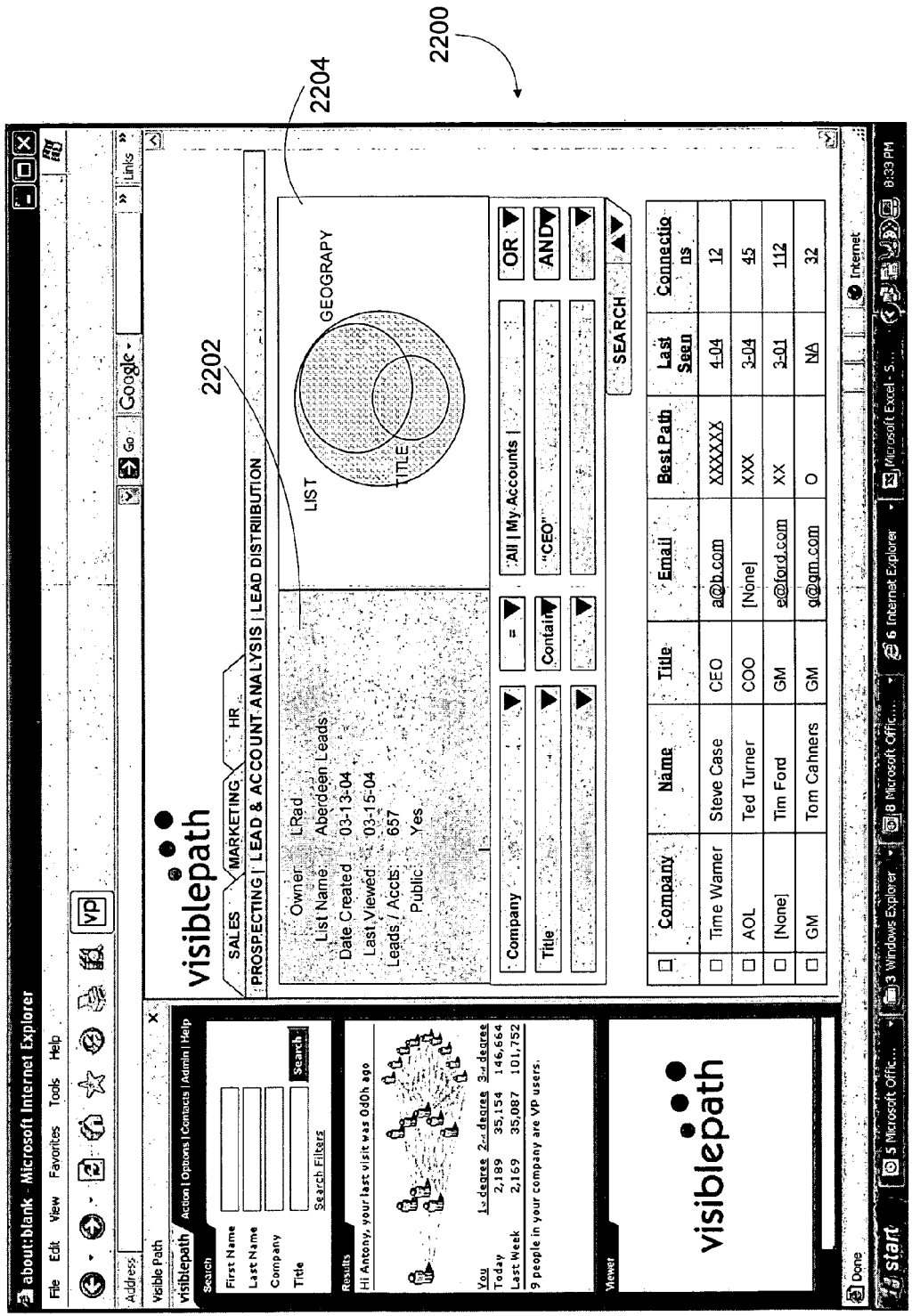
FIG. 22 is a user interface illustrating details of a saved search according to one embodiment of the present invention.

FIG. 22 is a user interface format 2200 according to one embodiment of the invention illustrating search results displayed in conjunction with search criteria. An information display 2202 presents information describing the search and a Venn diagram display 2204 presents a graphical representation of filtered information regarding one or more entities.

Figure 23:
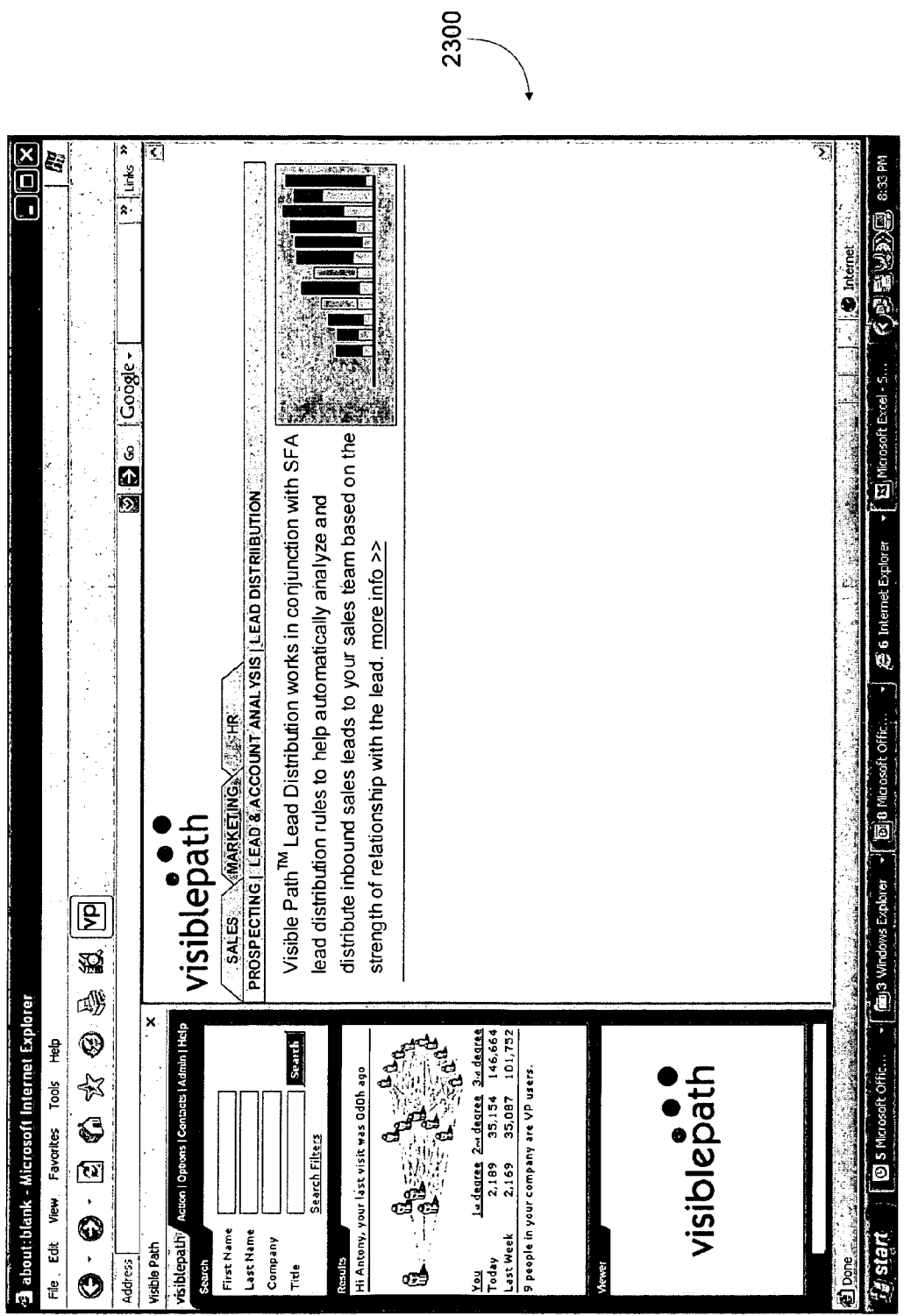
FIG. 23 is a user interface illustrating access to a software module for lead distribution information for a business process according to one embodiment of the present invention.

FIG. 23 is a user interface format 2300 according to one embodiment of the invention illustrating the display of lead distribution analysis. Inbound leads may be automatically or partially automatically analyzed and distributed to members of an enterprise, for example, according to a given member with whom the strongest relationship to an entity is determined to exist.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A method for facilitating business processes in an enterprise application, the method comprising:
   prospecting for a business lead, wherein said prospecting includes:
   (a) receiving a search criterion selected from the group consisting of a geographic region, an industry, a size of a business, and a combination thereof; and
   (b) searching data based on said search criterion, wherein said searching returns information about a prospective business contact;
   analyzing said information and data regarding a social network to determine a member of an enterprise in a path to said prospective business contact; and
   distributing to said member, said information and a representation of said path.

2. The method of claim 1, wherein said representation of said path comprises a graphic representation of said path.

3. The method of claim 2,
   wherein said method further comprises determining a strength for said path, and
   wherein said graphic representation indicates said strength.

4. The method of claim 1,
   wherein said searching discovers a plurality of prospective business contacts, and
   wherein said method further comprises prioritizing said plurality of business contacts.

5. The method of claim 1, wherein said distributing comprises displaying said information in conjunction with an application selected from the group consisting of a CRM application, a SFA application, an HCM application and a messaging application.

6. The method of claim 1,
   wherein said member is a first member of said enterprise, and said path is a first path, wherein said analyzing determines a second path between said prospective business contact and a second member of said enterprise, and
wherein said method further comprises distributing, to said second member, said information and a representation of said second path.

7. The method of claim 1,
wherein said member is a first member of said enterprise, and said path is a first path,
wherein said analyzing determines a second path between said prospective business contact and a second member of said enterprise, and
wherein said method further comprises:
   determining a first strength for said first path and a second strength for said second path; and
   prioritizing said first and second paths based on said first and second strengths.

8. The method of claim 1, wherein said path is through an intermediate member of said social network.

9. A method for facilitating business processes in an enterprise application, the method comprising:
prospecting for a business lead, wherein said prospecting includes:
   (a) receiving a search criterion selected from the group consisting of a geographic region, an industry, a size of a business, and a combination thereof;
   (b) searching data based on said search criterion, wherein said searching returns information about a prospective business contact;
analyzing said information and data regarding a social network to determine (a) a first member of an enterprise in a first path to said prospective business contact, and (b) a second member of said enterprise in a second path to said prospective business contact;
determining a first strength for said first path and a second strength for said second path;
prioritizing said first and second members based on said first strength and said second strength, thus yielding a highest ranked member and a highest ranked path; and
distributing to said highest ranked member, said information and a representation of said highest ranked path.

10. The method of claim 9, wherein said representation of said highest ranked path comprises a graphic representation of said highest ranked path.

11. The method of claim 10, wherein said graphic representation indicates a strength of said highest ranked path.

12. The method of claim 9, wherein said distributing comprises displaying said information in conjunction with an application selected from the group comprising a CRM application, a SFA application and an HRM application.

13. The method of claim 9, wherein said first path is through an intermediate member.

14. A system for facilitating business processes in an enterprise application comprising:
a prospecting module that prospects for a business lead, wherein said prospecting module:
   (a) receives a search criterion selected from the group consisting of a geographic region, an industry, a size of a business, and a combination thereof; and
   (b) searches data based on said search criterion, and yields a prospective business contact;
a lead and account analysis module that analyzes said information and data regarding a social network to determine a member of an enterprise in a path to said prospective business contact; and
a lead distribution module that distributes to said member, said information and a representation of said path.

15. The system of claim 14,
wherein said member is a first member of said enterprise, and said path is a first path,
wherein said lead and account analysis module also determines a second path between said prospective business contact and a second member of said enterprise, and
wherein said lead distribution module distributes, to said second member, said information and a representation of said second path.

16. The system of claim 14,
wherein said member is a first member of said enterprise, and said path is a first path,
wherein said lead and account analysis module also determines a second path between said prospective business contact and a second member of said enterprise, and
wherein said lead distribution module:
   determines a first strength for said first path and a second strength for said second path; and
   prioritizes said first and second paths based on said first and second strengths.

17. The system of claim 14, wherein said path is through an intermediate member of said social network.

18. A system for facilitating business processes in an enterprise application, comprising:
a prospecting module that prospects for a business lead, wherein said prospecting module:
   (a) receives a search criterion selected from the group consisting of a geographic region, an industry, a size of a business, and a combination thereof; and
   (b) searches data based on said search criterion, and yields a prospective business contact;
a lead and account analysis module that analyzes said information and data regarding a social network to determine (a) a first member of an enterprise in a first path to said prospective business contact, and (b) a second member of said enterprise in a second path to said prospective business contact; and
a lead distribution module that:
   determines a first strength for said first path and a second strength for said second path;
   prioritizes said first and second members based on said first strength and said second strength, thus yielding a highest ranked member and a highest ranked path; and
   distributes to said highest ranked member, said information and a representation of said highest ranked path.

19. The system of claim 18, wherein said first path is through an intermediate member.

* * * * *